United States Patent
Langenfeld

(10) Patent No.: US 10,352,421 B1
(45) Date of Patent: *Jul. 16, 2019

(54) HYDROSTATIC TRANSMISSION

(71) Applicant: Hydro-Gear Limited Partnership, Sullivan, IL (US)

(72) Inventor: Thomas J. Langenfeld, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 83 days.

This patent is subject to a terminal disclaimer.

(21) Appl. No.: 15/605,402

(22) Filed: May 25, 2017

Related U.S. Application Data

(63) Continuation of application No. 13/960,567, filed on Aug. 6, 2013, now Pat. No. 9,664,270.

(60) Provisional application No. 61/679,909, filed on Aug. 6, 2012.

(51) Int. Cl.
  *F16H 39/10* (2006.01)
  *F16H 39/42* (2006.01)

(52) U.S. Cl.
  CPC ............. *F16H 39/42* (2013.01); *F16H 39/10* (2013.01)

(58) Field of Classification Search
  CPC .... F16H 39/10; F16H 39/42; F16H 2039/105; F16H 61/40; F16H 61/42; F16H 61/46
  See application file for complete search history.

(56) References Cited

U.S. PATENT DOCUMENTS

| | | | |
|---|---|---|---|
| 2,165,895 A | 7/1939 | Joy | |
| 2,413,393 A | 12/1946 | Vickers | |
| 3,282,225 A | 11/1966 | Sunstrand | |
| 3,293,848 A | 12/1966 | Kuze | |
| 3,422,767 A | 1/1969 | Vickers | |
| 3,535,984 A | 10/1970 | Anderson | |
| 4,748,898 A | 6/1988 | Hayashi et al. | |
| 4,856,264 A | 8/1989 | Nishimura et al. | |
| 4,899,542 A | 2/1990 | Iino | |
| 4,934,252 A | 6/1990 | Giere | |
| 4,987,796 A | 1/1991 | Von Kaler et al. | |

(Continued)

FOREIGN PATENT DOCUMENTS

| EP | 1695609 | 8/2006 |
|---|---|---|
| EP | 2591989 | 11/2011 |

OTHER PUBLICATIONS

Misawa, et al., "Small Hydrostatic Transmission for Walk-Behind Lawn Mower," Honda R & D Co., Ltd., Japan, Nov. 1, 1991, pp. 553-561.

*Primary Examiner* — F Daniel Lopez
(74) *Attorney, Agent, or Firm* — Neal, Gerber & Eisenberg LLP

(57) ABSTRACT

A hydrostatic transmission includes a pump running surface and a motor running surface connected by internal porting formed in a housing member. A valve is disposed in the housing and connects a sump formed by the housing and the internal porting. A trunnion includes a first arm engaged to a swash plate to rotate the swash plate to vary the output of the pump, and a second arm which rotates with the first arm, the second arm having an operative end that is capable of opening the valve to permit a hydraulic connection between the internal porting and the sump through the valve bore when the trunnion is rotated to a predetermined position.

19 Claims, 22 Drawing Sheets

(56) References Cited

U.S. PATENT DOCUMENTS

| | | | |
|---|---|---|---|
| 5,040,649 A | 8/1991 | Okada | |
| 5,078,659 A | 1/1992 | Von Kaler et al. | |
| 5,094,077 A | 3/1992 | Okada | |
| 5,094,078 A | 3/1992 | Nishimura et al. | |
| 5,119,632 A | 6/1992 | Nishimura et al. | |
| 5,259,193 A | 11/1993 | Maesaka et al. | |
| 5,412,947 A | 5/1995 | Hirose | |
| 5,456,068 A | 10/1995 | Ishii et al. | |
| 5,495,712 A | 3/1996 | Yano et al. | |
| 5,497,623 A | 3/1996 | Hauser | |
| 5,718,105 A | 2/1998 | Irikura et al. | |
| 5,718,534 A | 2/1998 | Neuling | |
| 5,809,781 A | 9/1998 | Krantz | |
| 5,836,159 A | 11/1998 | Shimizu et al. | |
| 5,860,884 A | 1/1999 | Jolliff | |
| 5,971,881 A | 10/1999 | Jolliff | |
| 6,003,625 A | 12/1999 | Neuling | |
| 6,076,428 A | 6/2000 | Thoma et al. | |
| 6,343,471 B1 | 2/2002 | Thoma et al. | |
| 6,378,300 B1 | 4/2002 | Johnson et al. | |
| 6,427,442 B2 | 8/2002 | Thoma et al. | |
| 6,544,136 B2 | 4/2003 | Duan | |
| 6,681,570 B2 | 1/2004 | Takada et al. | |
| 6,688,417 B2 | 2/2004 | Hansell | |
| 6,755,019 B1 | 6/2004 | Phanco | |
| 6,904,748 B2 | 6/2005 | Takada et al. | |
| 7,017,343 B2 | 3/2006 | Takada et al. | |
| 7,165,398 B1 | 1/2007 | Holder et al. | |
| 7,234,385 B2 | 6/2007 | Dong et al. | |
| 7,373,871 B1 | 5/2008 | Buescher | |
| 7,510,035 B1 | 3/2009 | Irikura | |
| 7,739,870 B2 | 6/2010 | Carlson et al. | |
| 9,664,270 B1 * | 5/2017 | Langenfeld | F16H 39/42 |

\* cited by examiner

HYDROSTATIC TRANSMISSION

CROSS-REFERENCE

This application is a continuation of U.S. patent application Ser. No. 13/960,567, filed on Aug. 6, 2013, which claims the benefit of U.S. Provisional Patent Application No. 61/679,909 filed on Aug. 6, 2012. Both applications are incorporated by reference herein in their entirety.

BACKGROUND OF THE INVENTION

This application relates to hydraulic drive mechanisms and hydrostatic transmissions generally and, in particular, to transmissions intended for use in driving a vehicle or other powered machine or apparatus, such as a walk-behind lawn mower.

SUMMARY OF THE INVENTION

An improved hydrostatic transmission is disclosed herein, as described in more detail below. The transmission can be mounted on a vehicle or other powered machine or apparatus.

A better understanding of the objects, advantages, features, properties and relationships of the invention will be obtained from the following detailed description and accompanying drawings which set forth illustrative embodiments that are indicative of the various ways in which the principles of the invention may be employed.

DETAILED DESCRIPTION OF THE DRAWINGS

Figure 1:
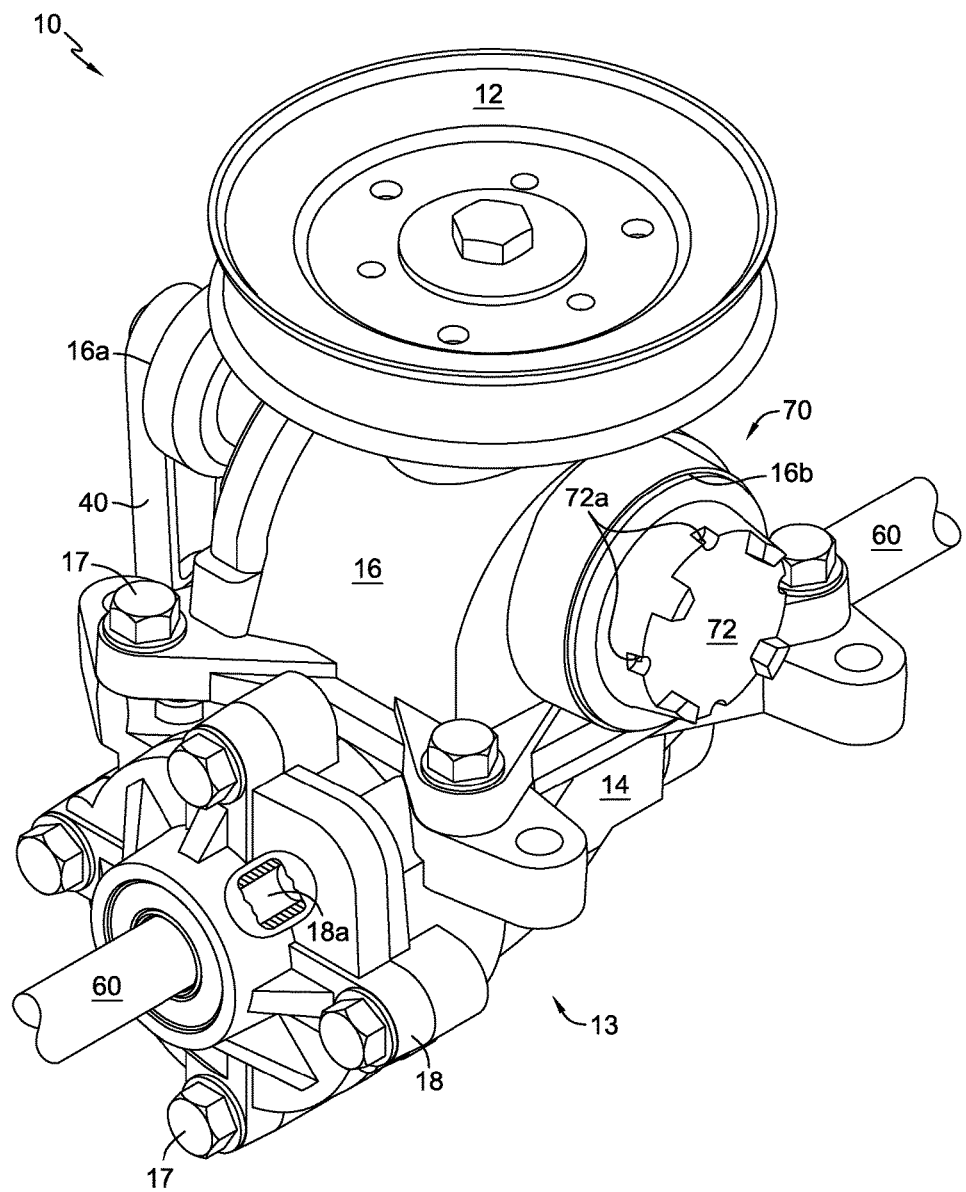
FIG. 1 is a perspective view of a first embodiment of a hydrostatic transmission.

The description that follows describes, illustrates and exemplifies one or more embodiments of the present invention in accordance with its principles. This description is not provided to limit the invention to the embodiment(s) described herein, but rather to explain and teach the principles of the invention in order to enable one of ordinary skill in the art to understand these principles and, with that understanding, be able to apply them to practice not only the embodiment(s) described herein, but also any other embodiment that may come to mind in accordance with these principles. The scope of the present invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers or serial numbers in cases where such labeling facilitates a more clear description. Additionally, the drawings set forth herein are not necessarily drawn to scale, and in some instances proportions may have been exaggerated to more clearly depict certain features. As stated above, the present specification is intended to be taken as a whole and interpreted in accordance with the principles of the present invention as taught herein and understood by one of ordinary skill in the art. It will be further understood that for clarity in certain cross-sectional views, certain elements are not shown in cross-section, as doing so would not assist in the understanding of the invention.

Figure 4:
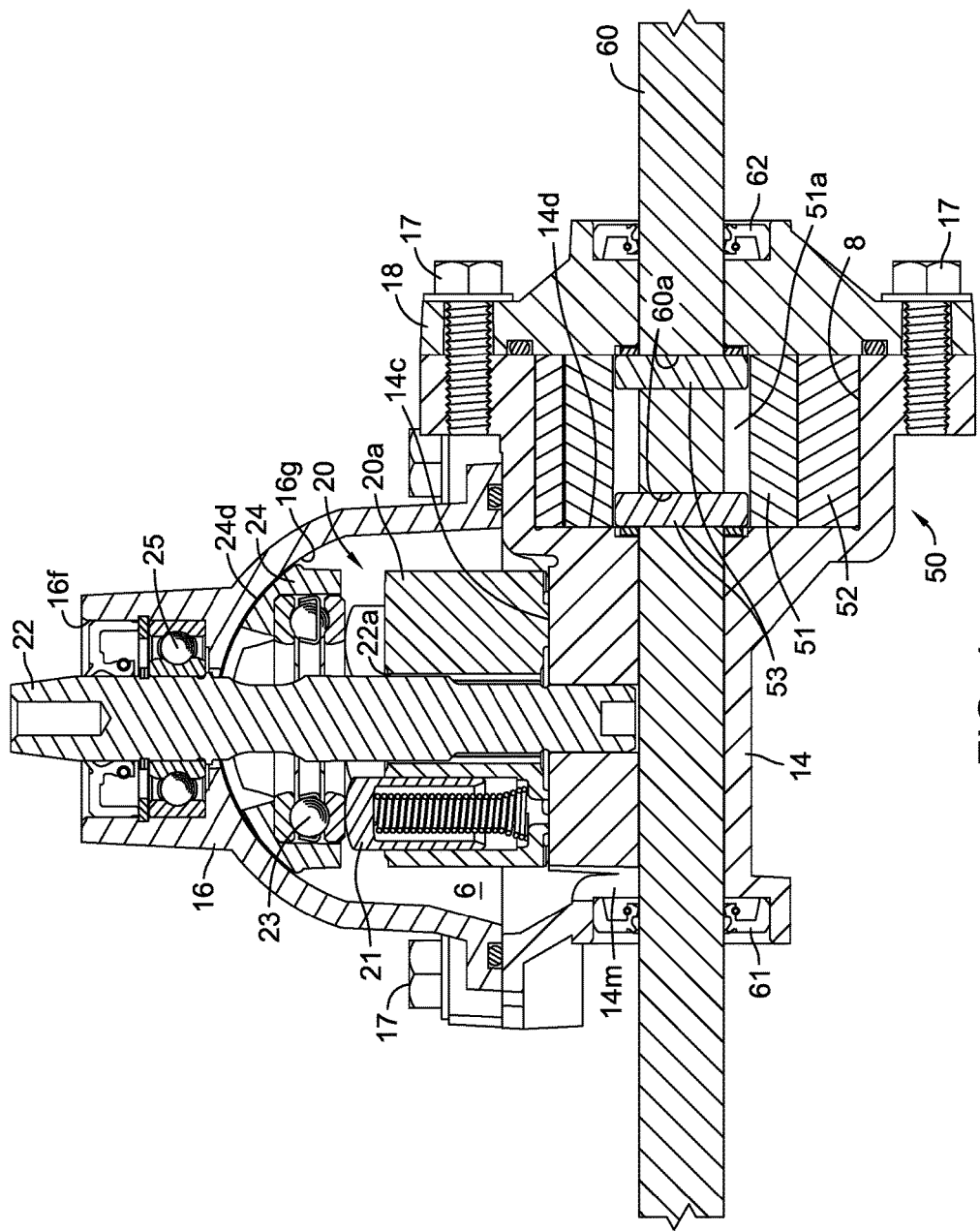
FIG. 4 is a cross-sectional view of the transmission of FIG. 3 along line 4-4 in FIG. 3.

FIGS. 1-7 illustrate an embodiment of a variable speed hydrostatic transmission 10. Transmission 10 generally includes a housing assembly 13, housing a pump assembly 20 coupled to and hydraulically driving a motor assembly 50. As depicted, pump assembly 20 is a variable displacement axial piston pump driven by an input shaft 22, while motor assembly 50 is a gerotor motor having an inner rotor 51 and outer rotor 52. The general designs and operation of the axial piston pump and gerotor motor are well-known in the art and will not be described in detail herein, except as noted below. An output shaft 60 of motor assembly 50 extends from both ends of housing assembly 13. The axis of rotation of output shaft 60 is generally perpendicular to the axis of input shaft 22. In transmission 10, the rotational axes of the input shaft 22 and the output shaft 60 are located on a common plane as shown in FIG. 4.

As illustrated in FIG. 1, input shaft 22 may have a pulley 12 secured to it capable of receiving a drive belt thereon (not shown) to power transmission 10. Optionally, with minor modification, input shaft 22 can be driven by other means of coupling either directly or indirectly to a prime mover (not shown). Various shaft coupling methods are well known and will not be described in detail herein. As shown in FIG. 4, input shaft 22 serves as a pump shaft and is drivingly engaged to a pump cylinder block 20a by means of a splined engagement 22a.

As illustrated, transmission 10 is a sealed unit having a housing assembly 13 enclosing an internal volume containing pump assembly 20 and motor assembly 50. Housing assembly 13 includes a main housing 14, a pump cover 16, and a motor cover 18 acting as first, second and third housing components. Pump cover 16 is secured to a first flange surface 14a (shown in FIG. 2) of main housing 14 to form a sump, namely pump chamber 6 about pump assembly 20. Motor cover 18 is secured to a second flange surface 14b (shown in FIG. 2) of main housing 14 to form a motor chamber 8 about motor assembly 50. Pump cover 16 and motor cover 18 are secured to the main housing 14 by a plurality of fasteners, such as screws 17 shown. Known sealing methods, such as an adhesive-sealant or a gasket can be used to seal these seams. As shown in FIG. 4, pump cover 16 has an opening 16f in which a first end of input shaft 22 is rotatably supported by bearing 25. The opposing end of input shaft 22 is rotatably supported by main housing 14.

Figure 6:
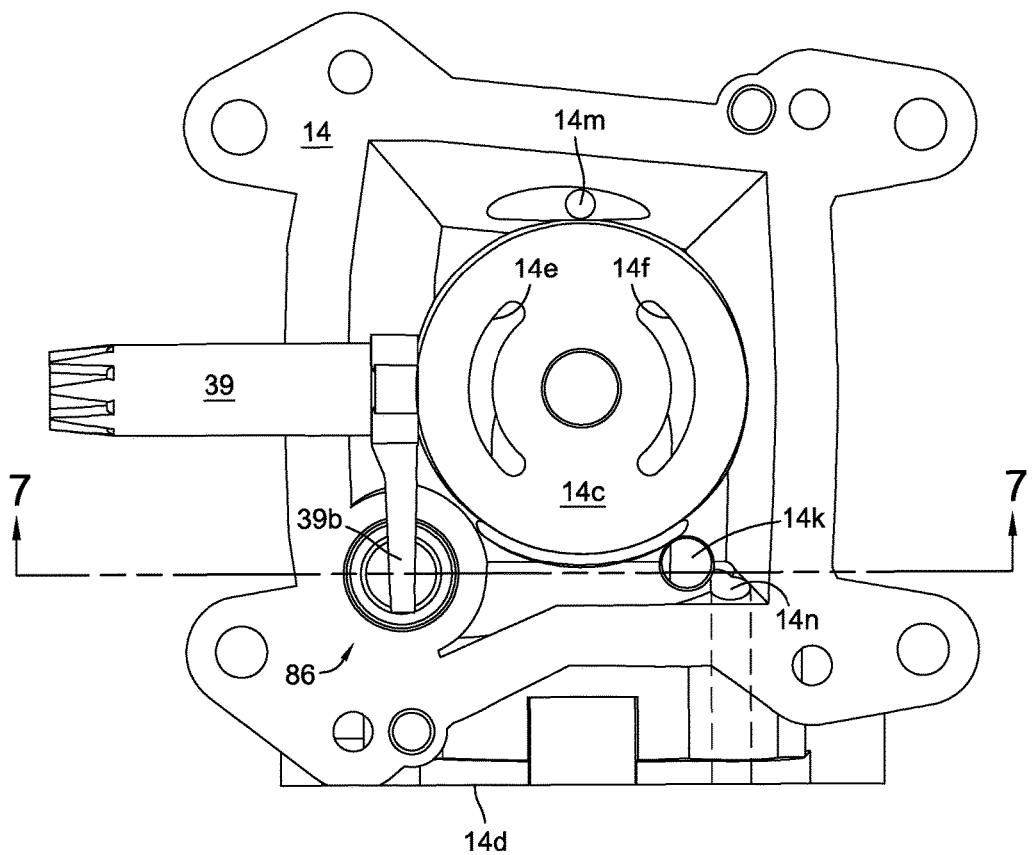
FIG. 6 is a plan view of a portion of the transmission of FIG. 1 with certain components removed for clarity.

Output shaft 60 is rotatably supported by motor cover 18 and main housing 14. Output shaft 60 is retained axially by pins 53 that are inserted in through-holes 60a formed in output shaft 60. Pins 53 are positioned in slot 51a formed in inner rotor 51 so that inner rotor 51 and output shaft 60 rotate together. A first output shaft seal 61 is provided in main housing 14 and a second output shaft seal 62 is provided in motor cover 18. As shown in FIGS. 4 and 6, a pressure relief passage 14m is formed in main housing 14 leading from pump chamber 6 to output shaft seal 61 to prevent over-pressurization of output shaft seal 61. This over-pressurization can be caused by rotation of output shaft 60 due to imperfections in the shape of output shaft 60 such that it acts as a pump. As shown in FIGS. 1 and 6, a pressure relief passage 14n is formed in main housing 14 and a pressure relief passage 18a leading from passage 14n to output shaft seal 62 is formed in motor cover 18. These pressure relief passages 14n and 18a cooperate to connect pump chamber 6 to output shaft seal 62 to similarly prevent over-pressurization of output shaft seal 62 caused by rotation of output shaft 60 or by pressurized leakage from motor assembly 50.

Main housing 14 also provides a pump running surface 14c for pump assembly 20 and a motor running surface 14d for motor assembly 50, with the pump running surface 14c oriented generally perpendicular to the motor running surface 14d. Hydraulic fluid passages 14g, 14h formed in main housing 14 permit fluid communication between the arcuate ports 14e, 14f formed on pump running surface 14c and corresponding ports (not shown) formed on motor running surface 14d, permitting the discharge of hydraulic fluid from pump assembly 20 to drive motor assembly 50 and its output shaft 60 in a known manner. Main housing 14 thereby eliminates the need for a separate center section containing such porting. It will be understood that the pump running surfaces depicted herein are shown without any additional valve plate between the pump and the running surface.

Figure 2:
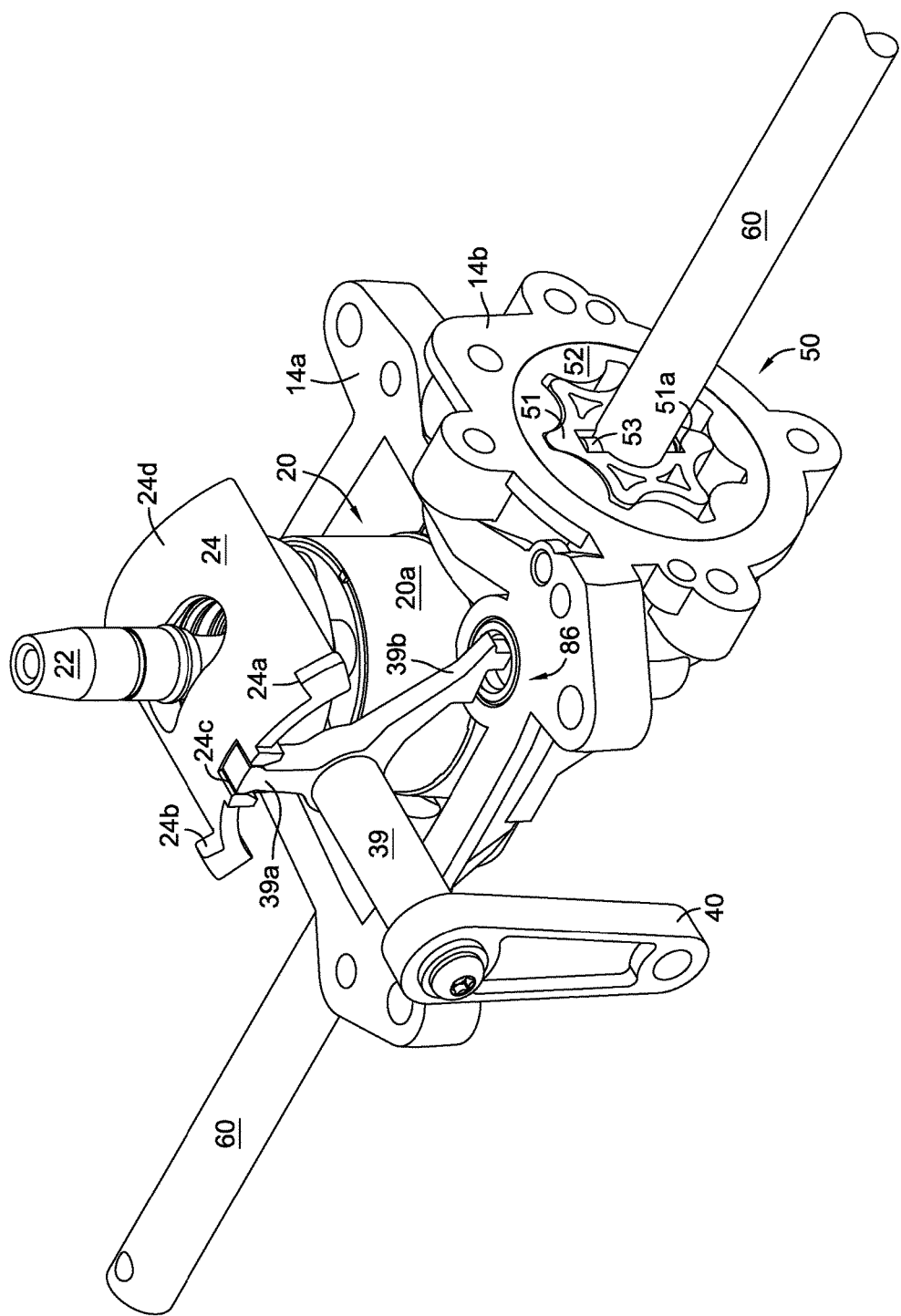
FIG. 2 is a perspective view of the transmission of FIG. 1 with certain components removed for clarity.
Figure 3:
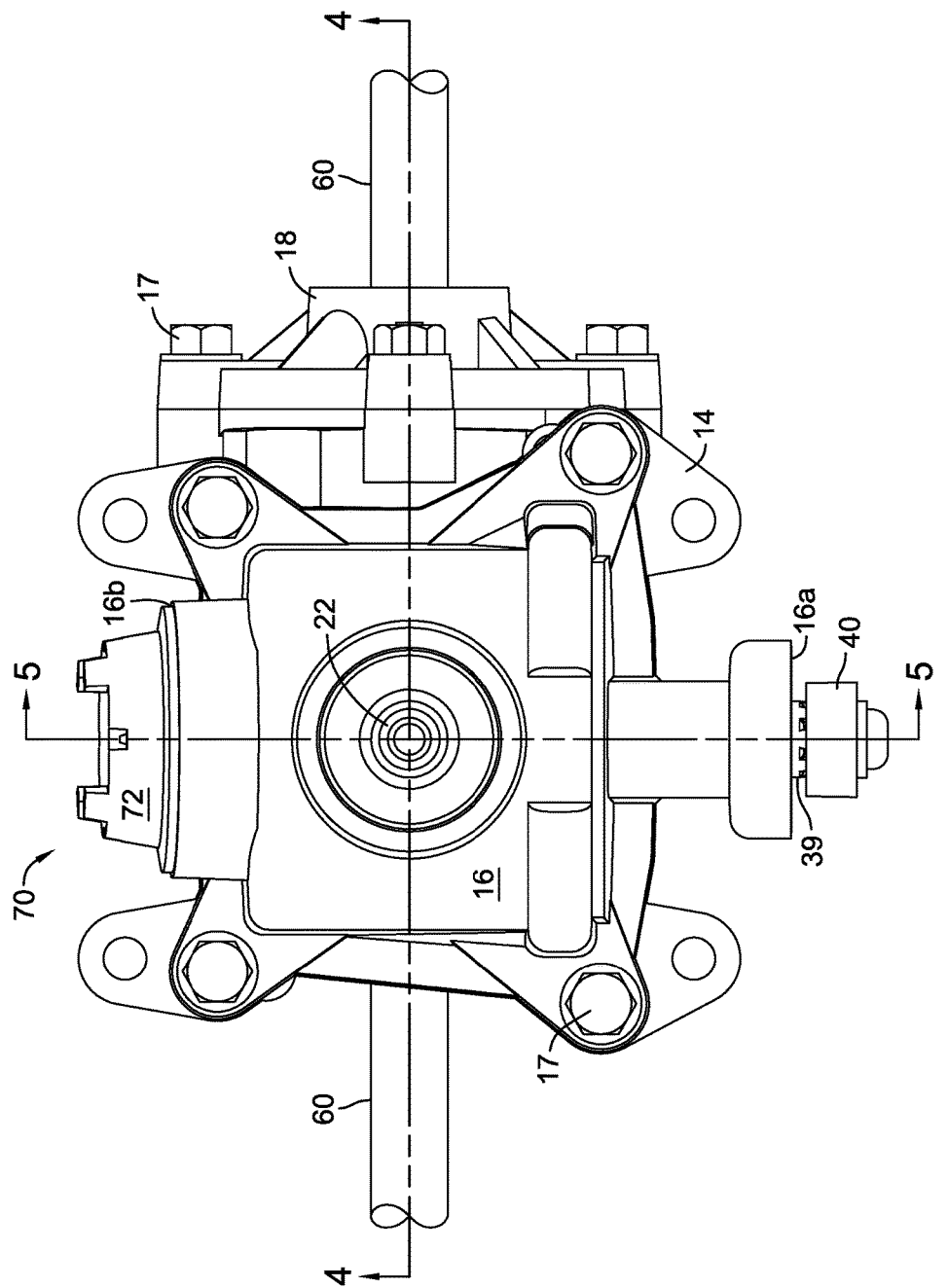
FIG. 3 is a plan view of the transmission of FIG. 1 with certain components removed for clarity.
Figure 5:
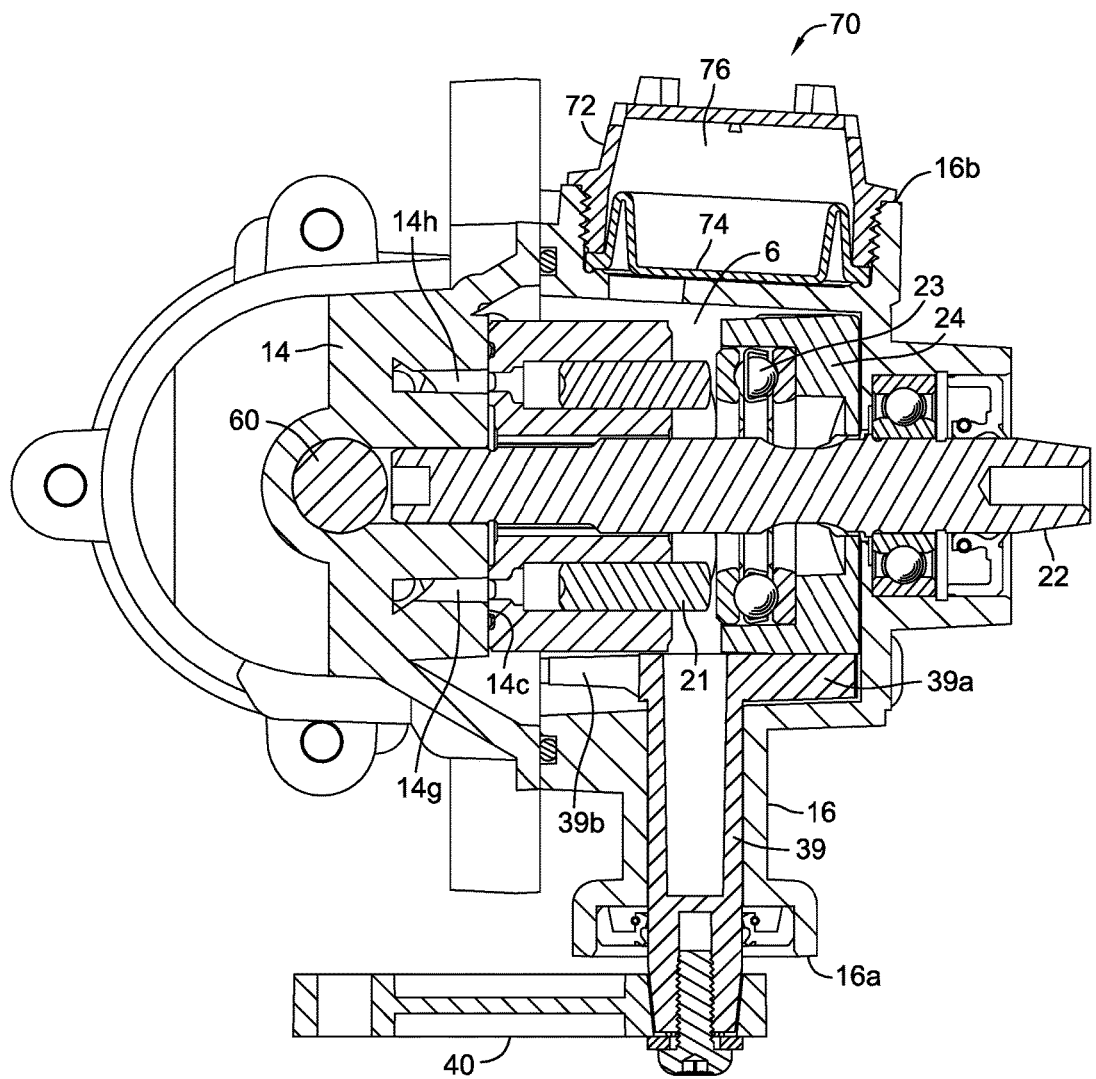
FIG. 5 is a cross-sectional view of the transmission of FIG. 3 along line 5-5 in FIG. 3.

As shown in FIGS. 2 and 5, the output of pump assembly 20 is adjustable via swash plate 24. A trunnion arm 39 for adjusting swash plate 24 passes through an opening 16a in a first side of pump cover 16. Trunnion arm 39 is connected to an external control arm 40 such that rotation of control arm 40 causes rotation of trunnion arm 39. Trunnion arm 39 has a first arm 39a that extends radially outward from its rotational axis and aligns with and engages a slot 24c formed in swash plate 24, such that rotation of trunnion arm 39 adjusts the rotational position of swash plate 24. As assembled, the convex surface 24d of swash plate 24 travels on the concave surface 16g of pump cover 16, which serves as a bearing. Swash plate 24 includes protrusions 24a and 24b that come into contact with stop features (not shown) formed in pump cover 16 to limit the rotational movement of swash plate 24 in a first and second direction, respectively. Trunnion arm 39 has a second arm 39b, which extends radially outward from the rotational axis so that its end is positioned proximate to a bypass valve 86, to serve as an actuator therefor. The function of bypass valve 86 is described in detail below.

The volume and direction of hydraulic fluid flow from pump assembly 20 is controlled by rotating control arm 40. A plurality of pistons 21 axially disposed in pump cylinder block 20a are in continuous contact with a thrust bearing 23 retained in swash plate 24. When an operator rotates control arm 40 in a clockwise or counterclockwise direction by means of controls and linkages (not shown), swash plate 24 is moved in an arc due to its engagement with first arm 39a. Movement of swash plate 24 changes the contact angle between the pistons 21 of pump cylinder block 20a and thrust bearing 23, thereby providing variable displacement hydraulic output to rotate motor assembly 50 at various speeds. As illustrated, neutral or zero displacement occurs when first arm 39a is generally parallel to input shaft 22, placing thrust bearing 23 in an orientation generally perpendicular to the axial direction of pistons 21. A swash plate and trunnion arm as shown herein is described in greater detail in commonly-owned U.S. Pat. No. 8,534,060, the disclosure of which is incorporated herein by reference. It should be understood that in the neutral position, subject to machining tolerances, second arm 39b does not crack bypass valve 86.

During a first or "forward" mode of operation (presuming input shaft 22 is driven in a clockwise rotational direction), when trunnion arm 39 is rotated from the neutral position in a first direction (counterclockwise for the embodiment shown in FIG. 2), the flow of hydraulic fluid from pump assembly 20 is increased, thus increasing the output speed of motor assembly 50 and its output shaft 60. In this first mode of operation, the second arm 39b does not engage or open bypass valve 86 and hydraulic fluid flows between pump assembly 20 and motor assembly 50 as previously described. Arcuate port 14e and fluid passage 14g represent the high pressure side of the hydraulic circuit, and arcuate port 14f and fluid passage 14h represent the low pressure side of the hydraulic circuit. Additionally, fluid passage 14k provides communication between the fluid volume in pump chamber 6 and the low pressure side of the hydraulic circuit, allowing make-up fluid to flow into passage 14h to replenish losses from the hydraulic circuit. Additionally, this pathway prevents reverse operation of transmission 10, effectively making the unit unidirectional.

Figure 7:
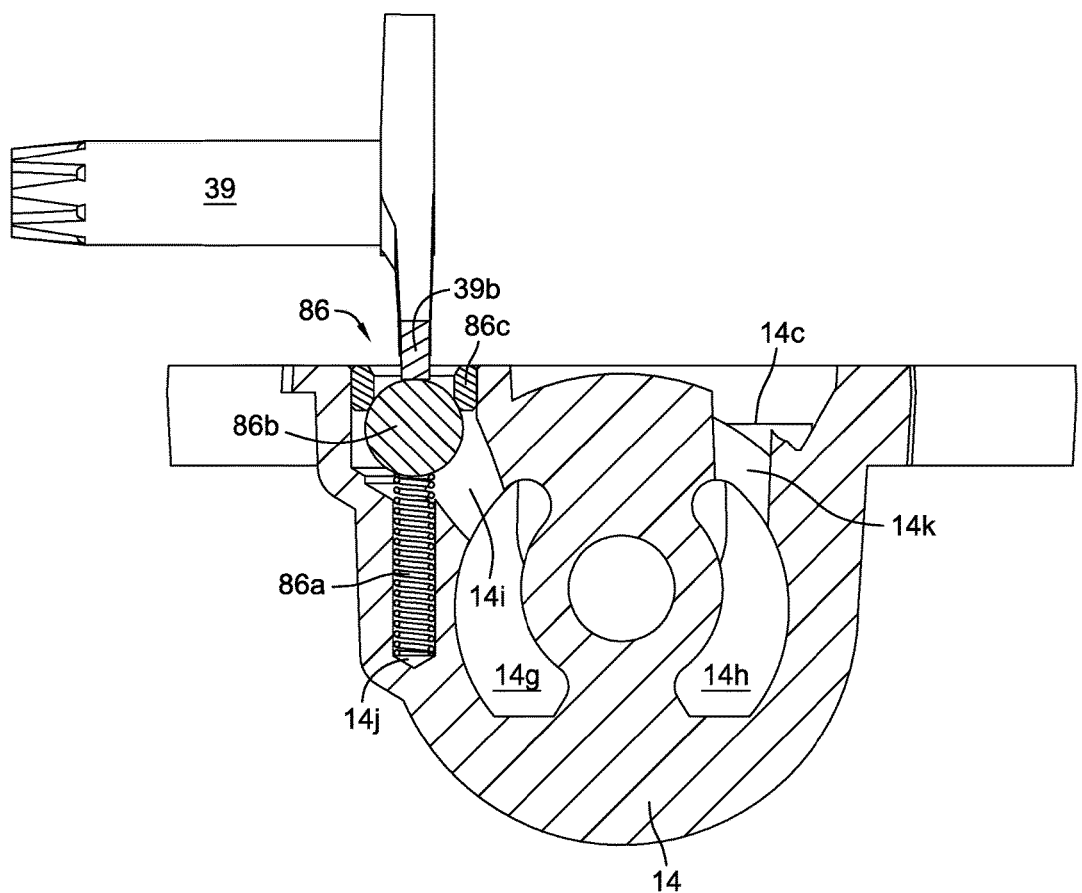
FIG. 7 is a cross-sectional view of a portion of the transmission of FIG. 6 along line 7-7 in FIG. 6.

As shown in FIG. 7, bypass valve 86 may be a ball and spring type check valve; however, other check valves known in the art may also be used in this application. Bypass valve 86 is positioned in bypass passage 14i between fluid passage 14g and pump chamber 6. Bypass valve 86 is biased to a closed position by a spring 86a housed in a spring pocket 14j formed in main housing 14. Spring 86a acts upon ball 86b to engage seat 86c, closing bypass valve 86. When bypass valve 86 is in the closed position, fluid communication from fluid passage 14g to pump chamber 6 is blocked, permitting fluid discharged from pump assembly 20 through arcuate port 14e to flow through fluid passage 14g and drive motor assembly 50 in the first mode of operation. Fluid pressure in bypass passage 14i assists in biasing bypass valve 86 to a closed position.

During a second or "bypass" mode of operation, trunnion arm 39 is rotated from the neutral position in a second, opposite direction (clockwise in FIG. 2) causing the second arm 39b to move ball 86b off seat 86c, opening bypass valve 86. Specifically, as trunnion arm 39 and swash plate 24 are rotated through the neutral position and into "reverse", passage 14h receives the discharge of pump assembly 20. Passage 14k connects passage 14h with pump chamber 6, and thus, provides a pathway for hydraulic fluid to circulate into pump chamber 6. The now open bypass valve 86 provides a return path for the hydraulic fluid back to pump assembly 20. This hydraulic circuit configuration is useful when, for example, the operator wishes to manually move the mower in reverse. The actuation of bypass valve 86 permits output shaft 60 to freely turn in reverse without hydraulic resistance. Conversely, at neutral with bypass valve 86 closed, a walk-behind mower so equipped cannot be pulled in reverse without difficulty.

Referring to FIGS. 1 and 5, an externally mounted fluid expansion bladder assembly 70 is provided to relieve case pressure from transmission 10 and prevent leakage of hydraulic fluid around various seals of transmission 10 as the fluid temperature rises and the fluid expands during operation of transmission 10. As shown in FIG. 1, bladder assembly 70 is located on pump cover 16 opposite control arm 40. Bladder assembly 70 is installed in an expansion bladder port 16b formed in pump cover 16. Port 16b can be internally threaded, as shown, to receive an expansion bladder cap 72. Expansion bladder assembly 70 comprises a chamber 76 defined on one end by the expansion bladder cap 72 and on the opposite end by a membrane 74, wherein membrane 74 seals off pump chamber 6 and is able to expand into chamber 76 to accommodate hydraulic fluid expansion. Expansion bladder cap 72 has a plurality of vents 72a open to outside air that permit the air volume in chamber 76 to be varied as hydraulic fluid volume varies with operating temperature.

Figure 9:
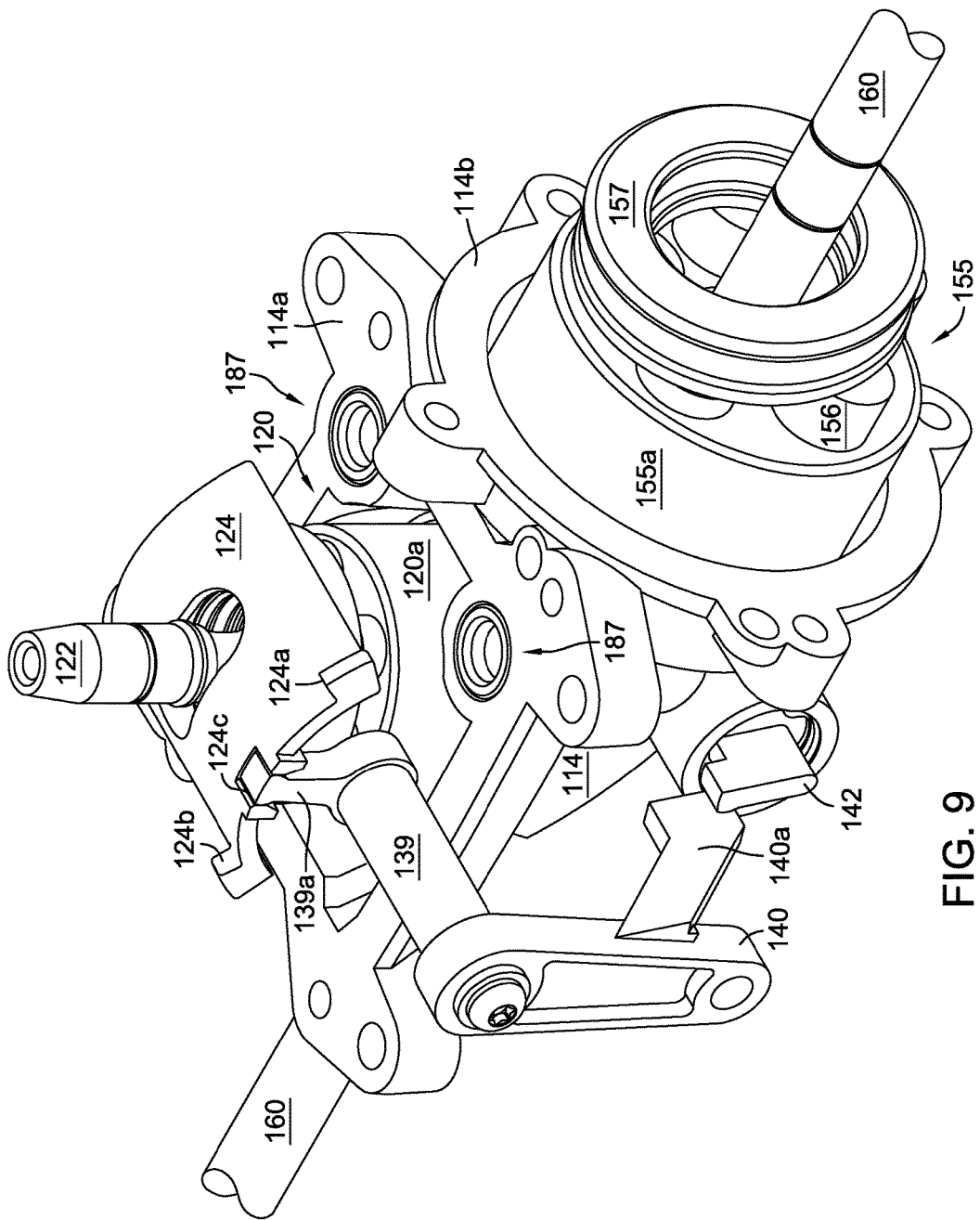
FIG. 9 is a perspective view of the transmission of FIG. 8 with certain components removed for clarity.
Figure 10:
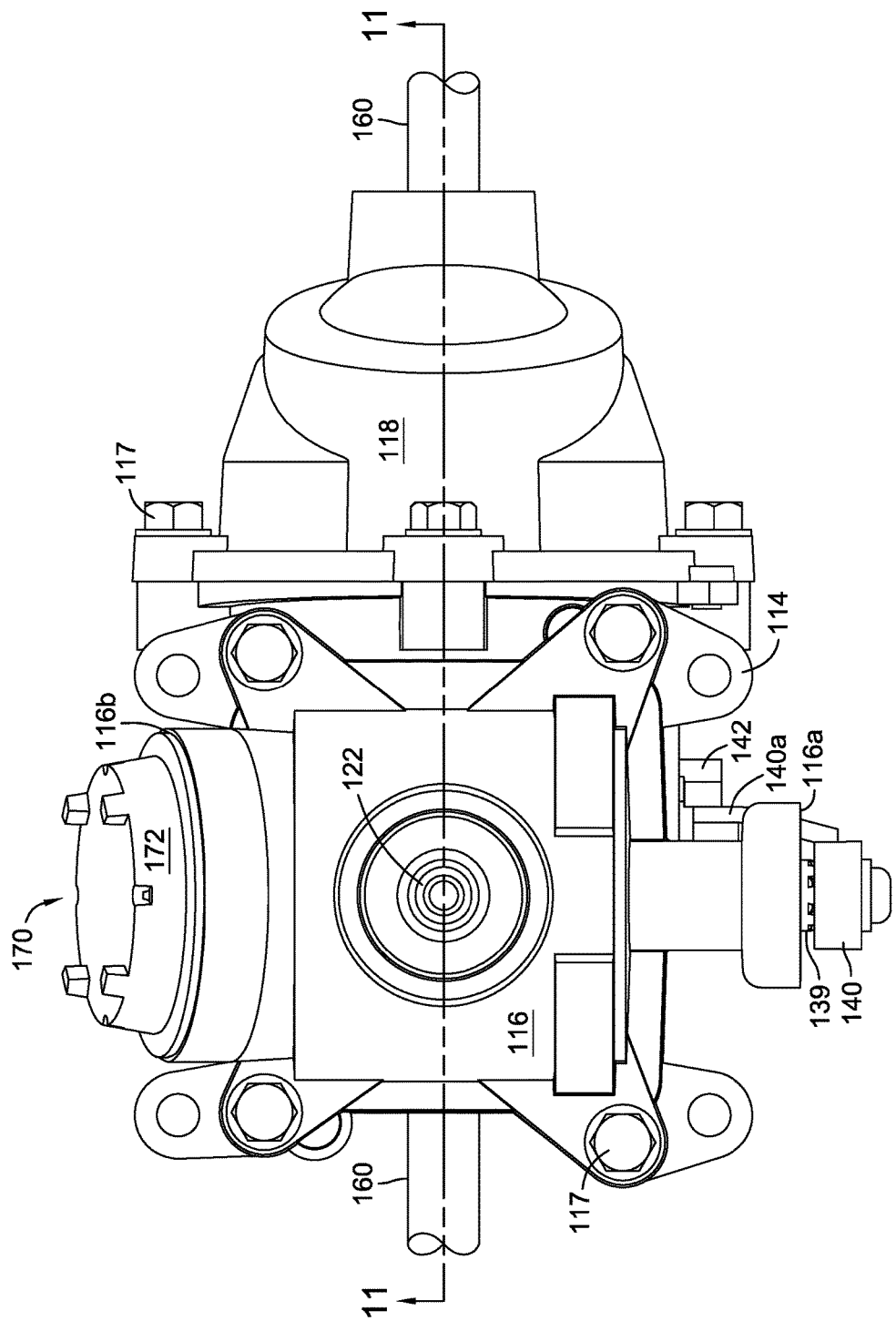
FIG. 10 is a plan view of the transmission of FIG. 8 with certain components removed for clarity.
Figure 11:
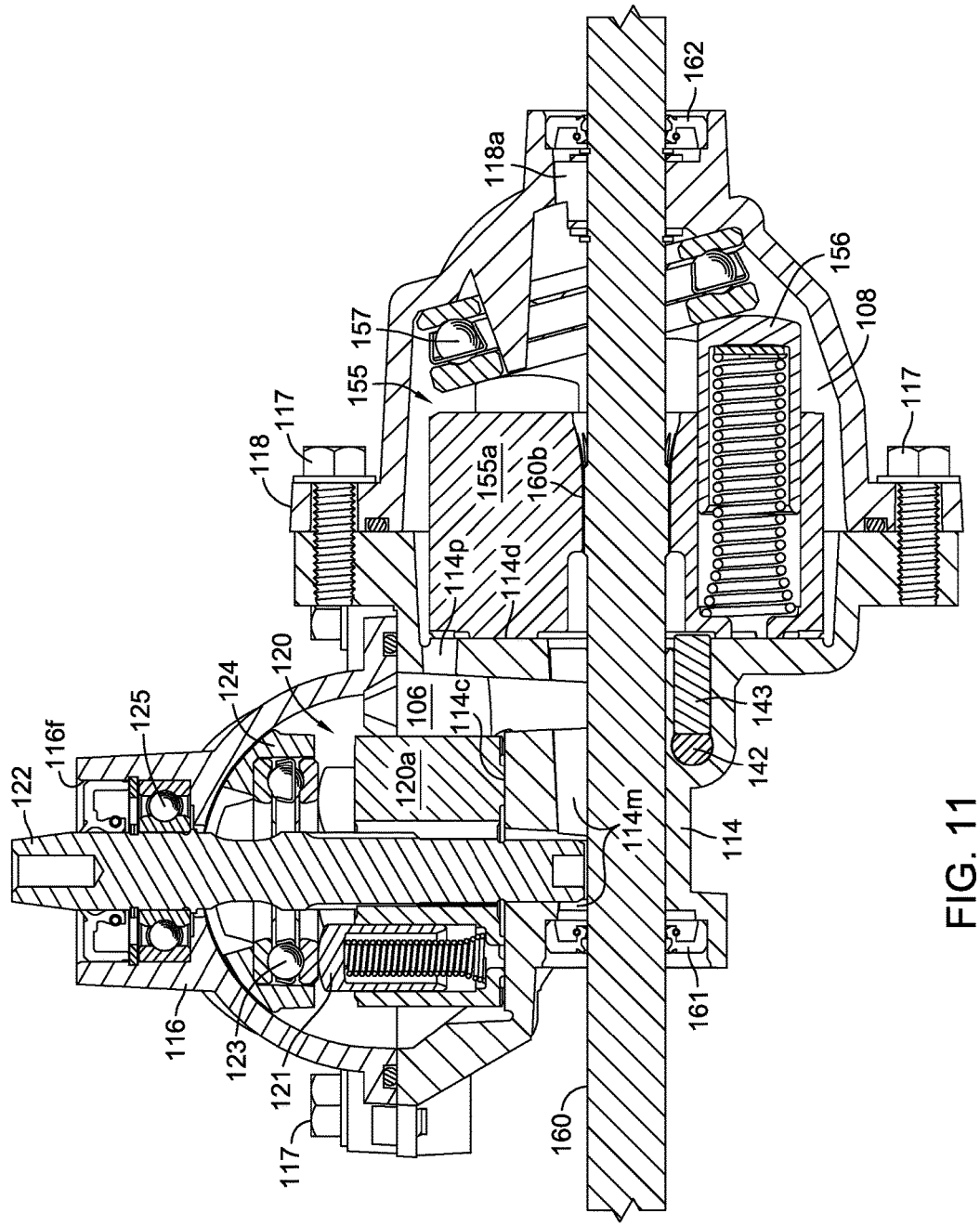
FIG. 11 is a cross-sectional view of the transmission of FIG. 10 along line 11-11 in FIG. 10.
Figure 12:
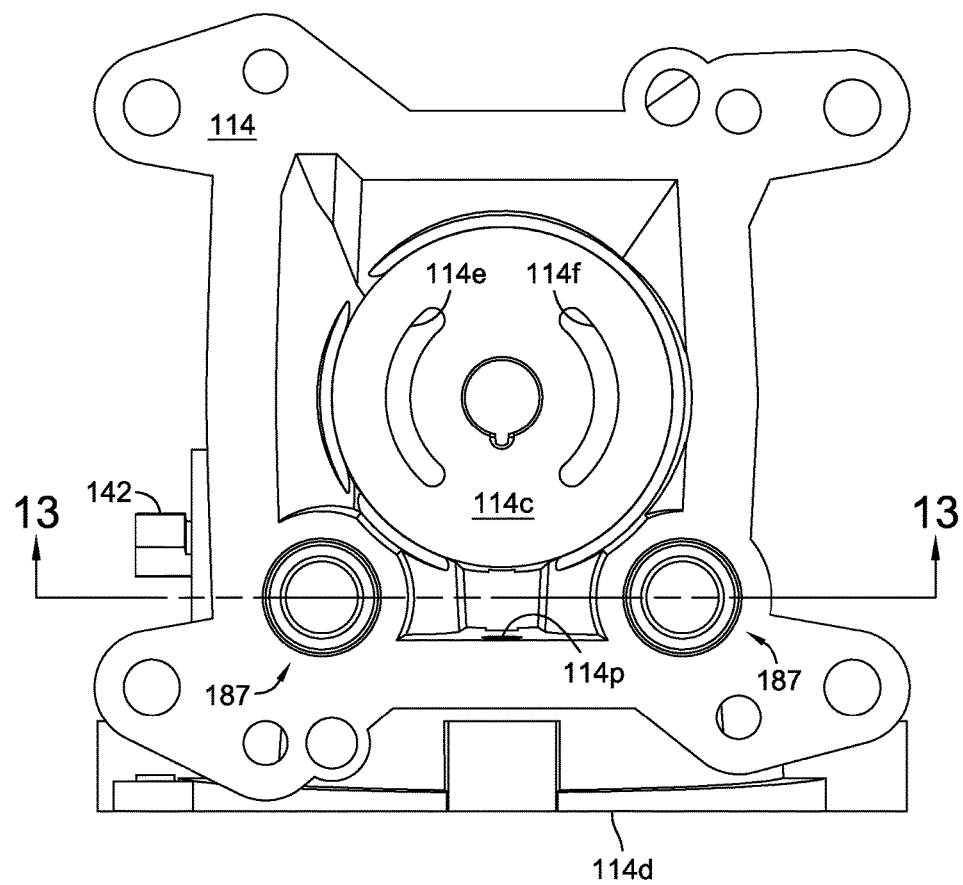
FIG. 12 is a plan view of a portion of the transmission of FIG. 8 with certain components removed for clarity.

FIGS. 8-13 illustrate a second embodiment of a variable speed hydrostatic transmission 110. Transmission 110 generally includes a housing assembly 113, housing a pump assembly 120 coupled to and hydraulically driving a motor assembly 155. As depicted, pump assembly 120 is a variable displacement axial piston pump driven by an input shaft 122, and motor assembly 155 is an axial piston motor having a motor cylinder block 155a and motor pistons 156 which bear against motor thrust bearing 157. The designs of the axial piston pump and motor are well-known in the art and will not be described in detail herein. An output shaft 160 of motor assembly 155 is engaged to and driven by motor cylinder block 155a and extends from both ends of housing assembly 113. Unlike the pinned engagement of inner rotor 51 and output shaft 60 for motor assembly 50, motor cylinder block 155a and output shaft 160 are joined by a splined engagement 160b, similar to that of the axial piston pump assemblies 20, 120 and their corresponding input shafts 22, 122, respectively. The axis of rotation of output shaft 160 is generally perpendicular to the axis of input shaft 122. In transmission 110, the rotational axes of the input shaft 122 and the output shaft 160 are located on a single plane as shown in FIG. 11.

Figure 8:
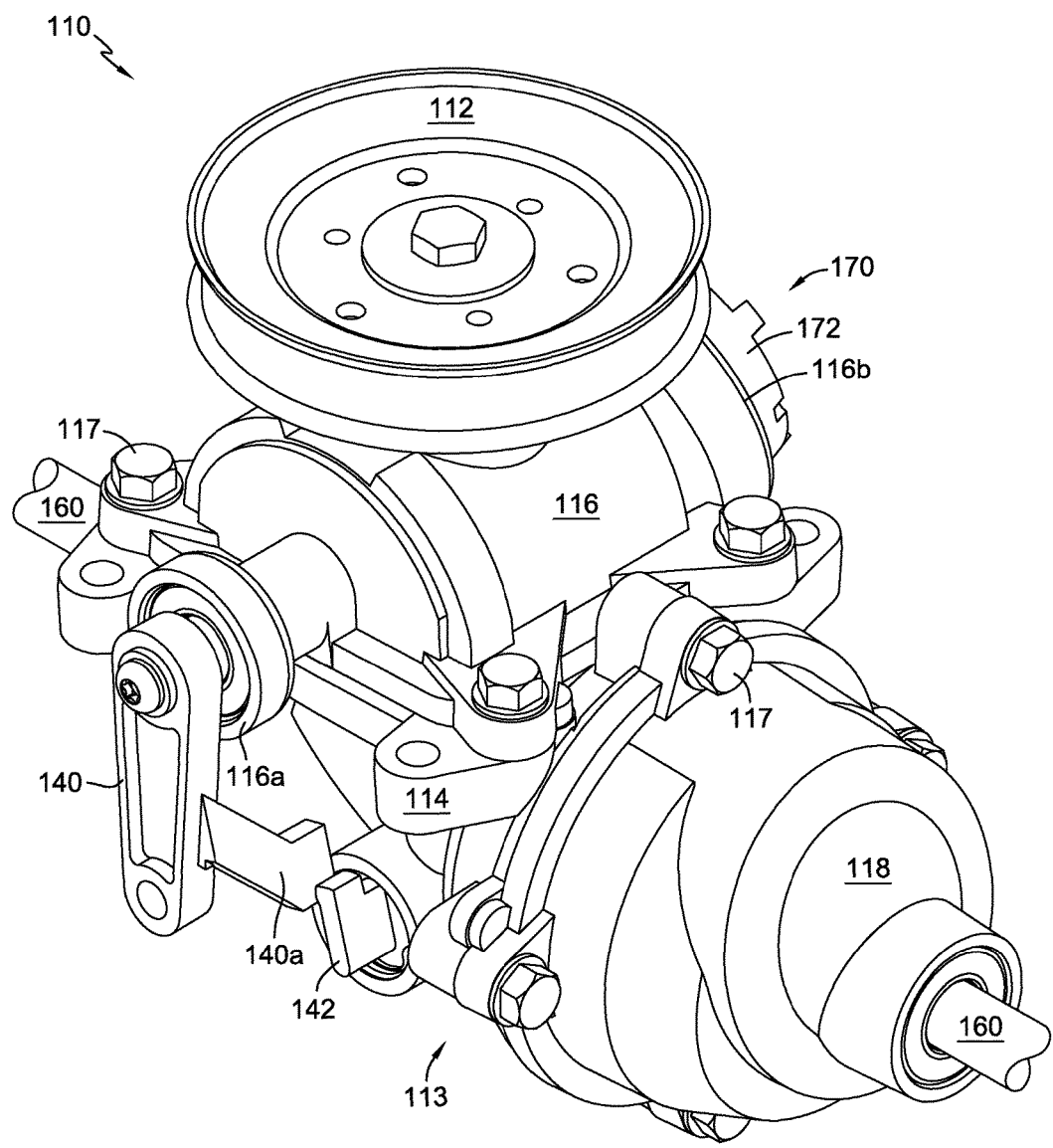
FIG. 8 is a perspective view of a second embodiment of a hydrostatic transmission.

As shown in FIG. 8, input shaft 122 may have a pulley 112 secured to it capable of receiving a drive belt thereon (not shown). Optionally, with minor modification, input shaft 122 can be driven by other means of coupling either directly or indirectly to a prime mover (not shown). As shown in FIG. 11, input shaft 122 serves as a pump shaft and is drivingly engaged to a pump cylinder block 120a.

As illustrated, transmission 110 is a sealed unit having a housing assembly 113 enclosing an internal volume containing pump assembly 120 and motor assembly 155. Housing assembly 113 includes a main housing 114, a pump cover 116, and a motor cover 118. Pump cover 116 is secured to a first flange surface 114a (shown in FIG. 9) of main housing 114 to form a pump chamber 106 about pump assembly 120. Motor cover 118 is secured to a second flange surface 114b (shown in FIG. 9) of main housing 114 to form a motor chamber 108 about motor assembly 155. Pump cover 116 and motor cover 118 are secured to the main housing 114 by a plurality of fasteners, such as screws 117 shown. As shown in FIG. 11, pump cover 116 has an opening 116f in which a first end of input shaft 122 is rotatably supported by bearing 125. The opposing end of input shaft 122 is rotatably supported by main housing 114.

Figure 13:
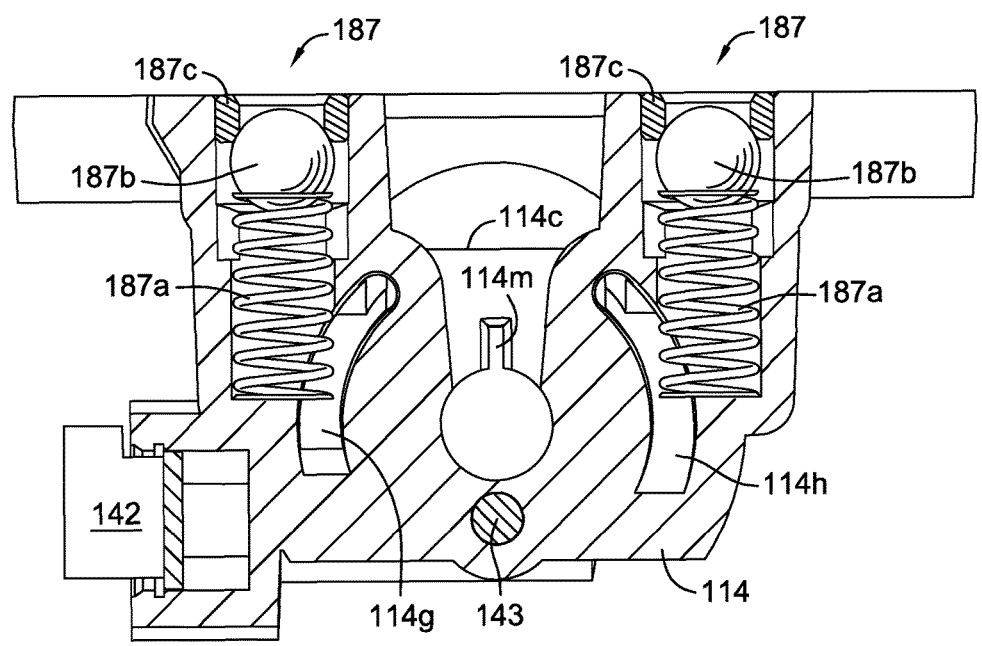
FIG. 13 is a cross-sectional view of a portion of the transmission of FIG. 12 along line 13-13 in FIG. 12.

Output shaft 160 is rotatably supported by motor cover 118 and main housing 114. A first output shaft seal 161 is provided in main housing 114 and a second output shaft seal 162 is provided in motor cover 118. As shown in FIGS. 11 and 13, a pressure relief passage 114m is formed in main housing 114 leading from pump chamber 106 to output shaft seal 161 to prevent over-pressurization of output shaft seal 161 caused by shaft rotation pumping effects. As shown in FIG. 11, a pressure relief passage 118a is formed in motor cover 118 leading from motor chamber 108 to output shaft seal 162 to similarly prevent over-pressurization of output shaft seal 162.

Similar to the main housing 14 of the previous embodiment, main housing 114 provides a pump running surface 114c for pump assembly 120 and a motor running surface 114d for motor assembly 155, with the pump running surface 114c oriented generally perpendicular to the motor running surface 114d. Hydraulic fluid passages 114g, 114h formed in main housing 114 permit fluid communication between the arcuate ports 114e, 114f formed on pump running surface 114c and corresponding ports (not shown) formed on motor running surface 114d, permitting the discharge of hydraulic fluid from pump assembly 120 to drive motor assembly 155 and its output shaft 160 in a known manner. Main housing 114 thereby eliminates the need for a separate center section containing such porting. A drain passage 114p formed in main housing 114 allows excess hydraulic fluid in motor chamber 108 to drain into pump chamber 106.

As shown in FIGS. 9-11, the output of pump assembly 120 is adjustable via swash plate 124. A trunnion arm 139 for adjusting swash plate 124 passes through an opening 116a in a first side of pump cover 116. Trunnion arm 139 is connected to a control arm 140 such that rotation of control arm 140 causes rotation of trunnion arm 139. Unlike trunnion arm 39 of the previous embodiment, trunnion arm 139 only has a singular arm 139a that extends radially outward from its rotational axis and aligns with and engages a slot 124c formed in swash plate 124, such that rotation of trunnion arm 139 adjusts the rotational position of swash plate 124. Swash plate 124 includes protrusions 124a and 124b that come into contact with stop features (not shown) formed in pump cover 116 to limit the rotational movement of swash plate 124 in a first and second direction, respectively. Control arm 140 has a bypass actuation arm 140a, which extends from control arm 140 so that its end is positioned proximate to bypass cam 142, the function of which is described in greater detail below.

Referring primarily to FIGS. 9 and 11, the volume and direction of hydraulic fluid flow from pump assembly 120 is controlled by rotating control arm 140. A plurality of pump pistons 121 axially disposed in pump cylinder block 120*a* are in continuous contact with a pump thrust bearing 123 retained in swash plate 124.

When an operator rotates control arm 140 in a clockwise or counterclockwise direction by means of controls and linkages (not shown), swash plate 124 is moved in an arc due to its engagement with arm 139*a*. Movement of swash plate 124 changes the contact angle between the pump pistons 121 of pump cylinder block 120*a* and pump thrust bearing 123, thereby providing variable displacement hydraulic output to rotate motor assembly 155 at various speeds. As illustrated, neutral or zero displacement occurs when arm 139*a* is generally parallel to input shaft 122, placing pump thrust bearing 123 in an orientation generally perpendicular to the axial direction of pump pistons 121. It is to be understood that bypass actuation arm 140*a* does not affect rotation of bypass cam 142, and hence bypass, at neutral.

During a first or "forward" mode of operation, when trunnion arm 139 is rotated from the neutral position in a first direction (clockwise for the embodiment shown in FIG. 9), the flow of hydraulic fluid from pump assembly 120 is increased, thus increasing the output speed of motor assembly 155 and its output shaft 160. The bypass cam 142 remains unaffected, and hydraulic fluid flows between pump assembly 120 and motor assembly 155 through the hydraulic circuit previously described. Depending upon the direction of rotation of input shaft 122, one of a pair of check valves 187 disposed in porting formed in main housing 114 between fluid passages 114*g*, 114*h*, respectively, and pump chamber 106 serves as a make-up valve to replace fluid losses during this first mode of operation.

As shown in FIG. 13, check valves 187 may be a ball and spring type check valve; however, other valves known in the art, such as combination check/relief valves may be used depending upon hydraulic circuit needs. Check valves 187 are biased to a closed position by a spring 187*a* acting upon a ball 187*b* to engage a seat 187*c*. When the fluid pressure in fluid passage 114*g* or 114*h* (in combination with the spring force of spring 187*a*) is lower than the fluid pressure in pump chamber 106, check valve 187 is cracked and make-up fluid is introduced into the hydraulic circuit.

During a second or "bypass" mode of operation, trunnion arm 139 is rotated from the neutral position in a second, opposite direction (counterclockwise in FIG. 9) causing bypass actuation arm 140*a* to bear upon and rotate bypass cam 142. As best shown in FIG. 11, bypass cam 142 in turn bears upon block lift pin 143 and causes block lift pin 143 to lift motor cylinder block 155*a* off running surface 114*d*. Consequently, hydraulic fluid flow between motor assembly 155 and pump assembly 120 is broken. Without a return of hydraulic fluid from motor assembly 155, pump assembly 120 may draw hydraulic fluid from pump chamber 106 through the other of the check valves 187, or directly from motor chamber 108 via the applicable fluid passage 114*g* or 114*h*. As a result, pump 120 is prevented from driving motor 155 in reverse and allows an operator of a walk-behind lawn mower, for example, to manually move the mower in reverse without encountering hydraulic resistance. It will be understood that the presence of bypass actuation arm 140*a* converts an otherwise bidirectional unit to a unidirectional unit.

As in the first embodiment, a fluid expansion bladder assembly 170 is provided to relieve case pressure from transmission 110 and prevent leakage of hydraulic fluid around various seals of transmission 110 as the hydraulic fluid temperature rises and the fluid expands during operation of transmission 110. As shown in FIGS. 8 and 10, bladder assembly 170 is located on pump cover 116 opposite control arm 140. Bladder assembly 170 can be of the same form and function as bladder assembly 70 and is installed in an expansion bladder port 116*b* formed in pump cover 116. Port 116*b* can be internally threaded to receive an expansion bladder cap 172.

FIGS. 14-22 illustrate a third embodiment of a variable speed hydrostatic transmission 210. It varies from the first and second embodiments in that the axis of rotation of its trunnion arm 239 is generally parallel, as opposed to perpendicular, to the axis of rotation of motor output shaft 260. In addition, its pump input shaft 222 is not substantially coplanar with its motor output shaft 260, being offset therefrom. These and other differences will be described in detail below.

Transmission 210 generally includes a housing assembly 213, housing a pump assembly 220 coupled to and hydraulically driving a motor assembly 255. As depicted, pump assembly 220 is a variable displacement axial piston pump driven by an input shaft 222, and motor assembly 255 is an axial piston motor having a motor cylinder block 255*a* and motor pistons 256 which bear against motor thrust bearing 257. The designs of the axial piston pump and motor are well-known in the art and will not be described in detail herein. An output shaft 260 of motor assembly 255 is driven by motor cylinder block 255*a* and extends from both ends of housing assembly 213. The axis of rotation of output shaft 260 is generally perpendicular to the axis of input shaft 222, but offset therefrom.

Figure 14:
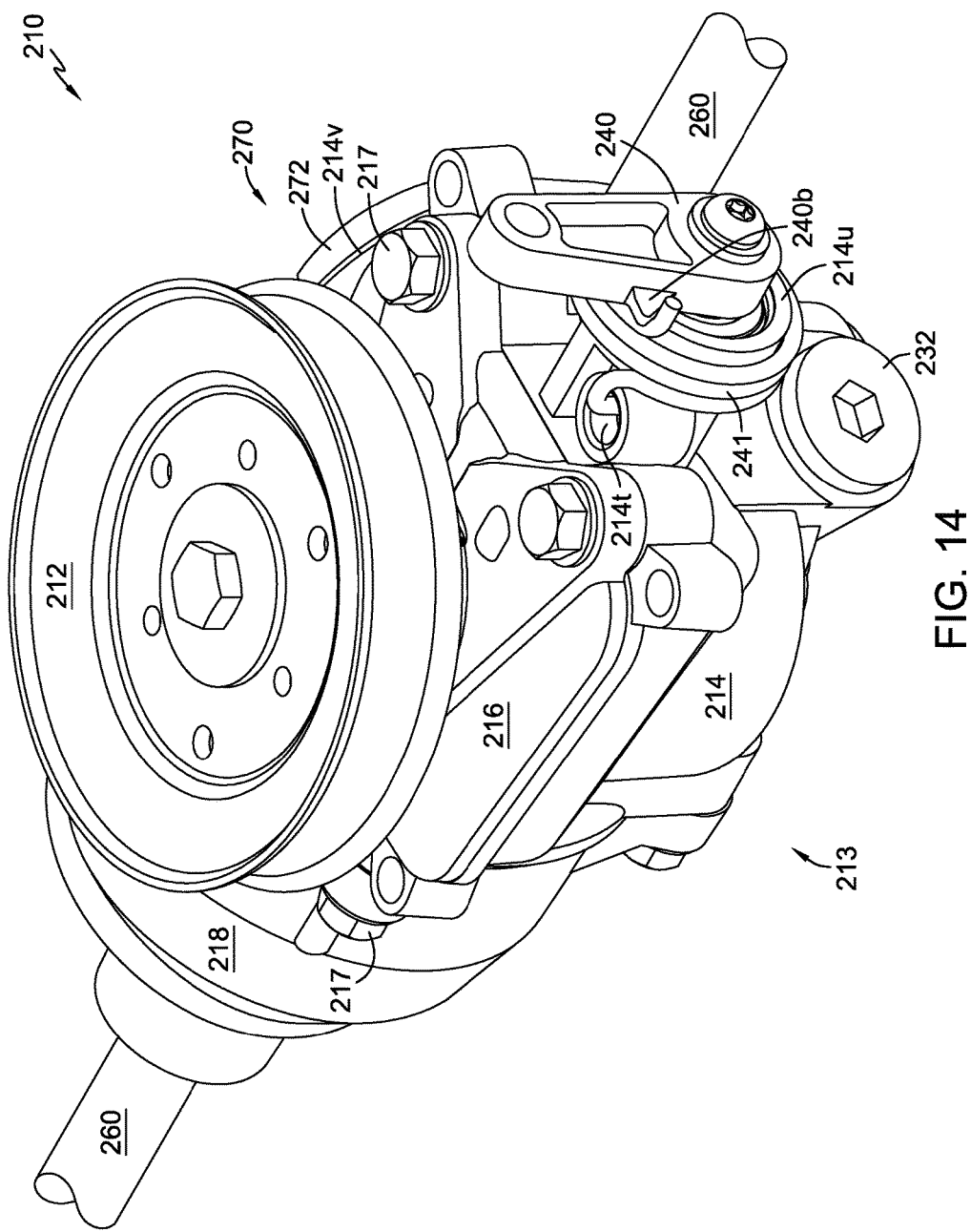
FIG. 14 is a perspective view of a third embodiment of a hydrostatic transmission.
Figure 17:
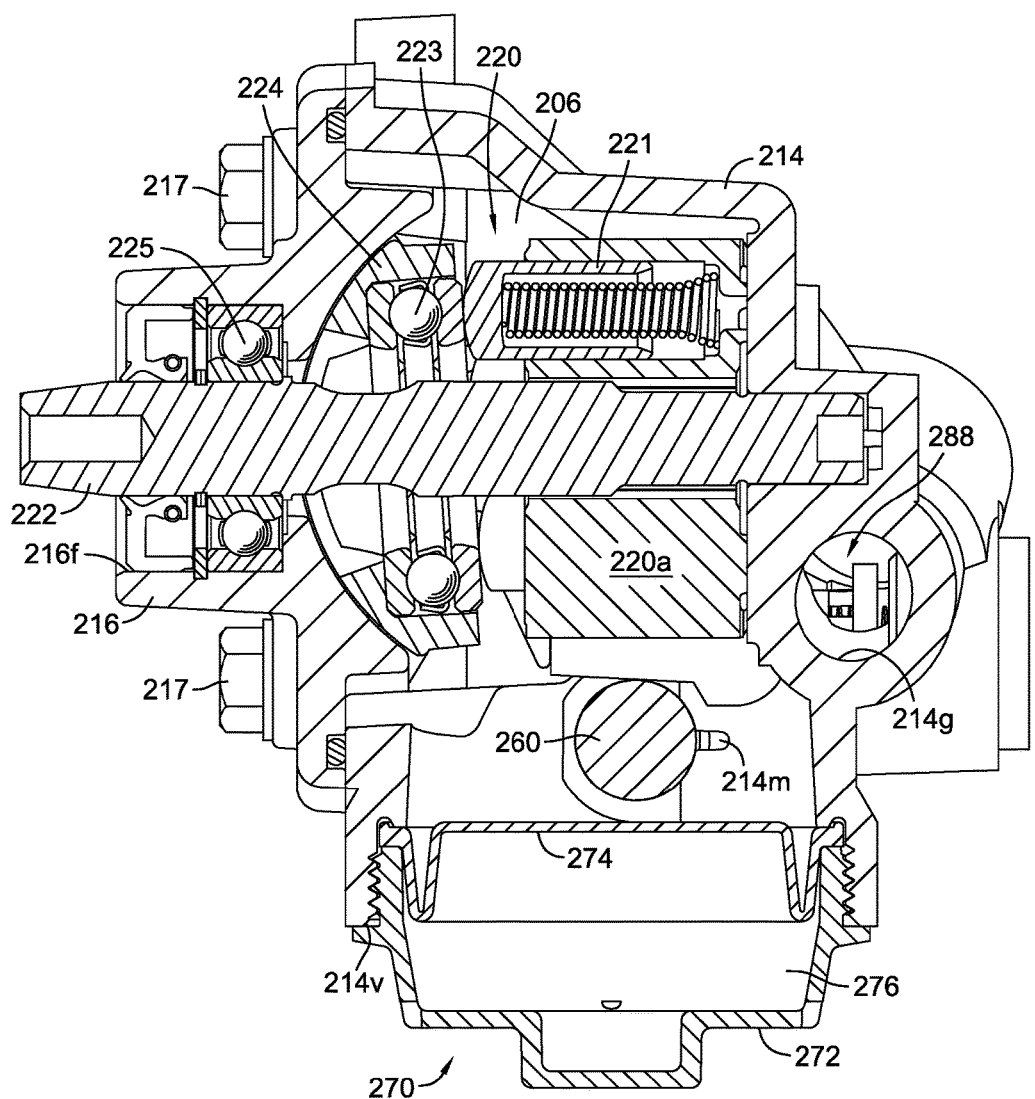
FIG. 17 is a cross-sectional view of a portion of the transmission of FIG. 16 along line 17-17 in FIG. 16.

As shown in FIG. 14, input shaft 222 may have a pulley 212 secured to it capable of receiving a drive belt thereon (not shown). Optionally, with minor modification, input shaft 222 can be driven by other means of coupling either directly or indirectly to a prime mover (not shown). As shown in FIG. 17, input shaft 222 serves as a pump shaft and is drivingly engaged to a pump cylinder block 220*a*.

As illustrated, transmission 210 is a sealed unit having a housing assembly 213 enclosing an internal volume containing pump assembly 220 and motor assembly 255. Housing assembly 213 includes a main housing 214, a pump cover 216, and a motor cover 218. Pump cover 216 is secured to a first flange surface 214*a* (shown in FIG. 15) of main housing 214 to form a pump chamber 206 about pump assembly 220. Unlike the pump covers 16, 116 of the previously described embodiments, a three fastener mounting is utilized. Motor cover 218 is secured to a second flange surface 214*b* (shown in FIG. 22) of main housing 214 to form a motor chamber 208 about motor assembly 255. Pump cover 216 and motor cover 218 are secured to the main housing 214 by a plurality of fasteners, such as screws 217. Fluid passage bore plug 232 closes off a passage in main housing 214 that is an artifact of the main housing machining process. As shown in FIG. 17, pump cover 216 has an opening 216*f* in which a first end of input shaft 222 is rotatably supported by a bearing 225. The opposing end of input shaft 222 is rotatably supported by main housing 214.

Figure 18:
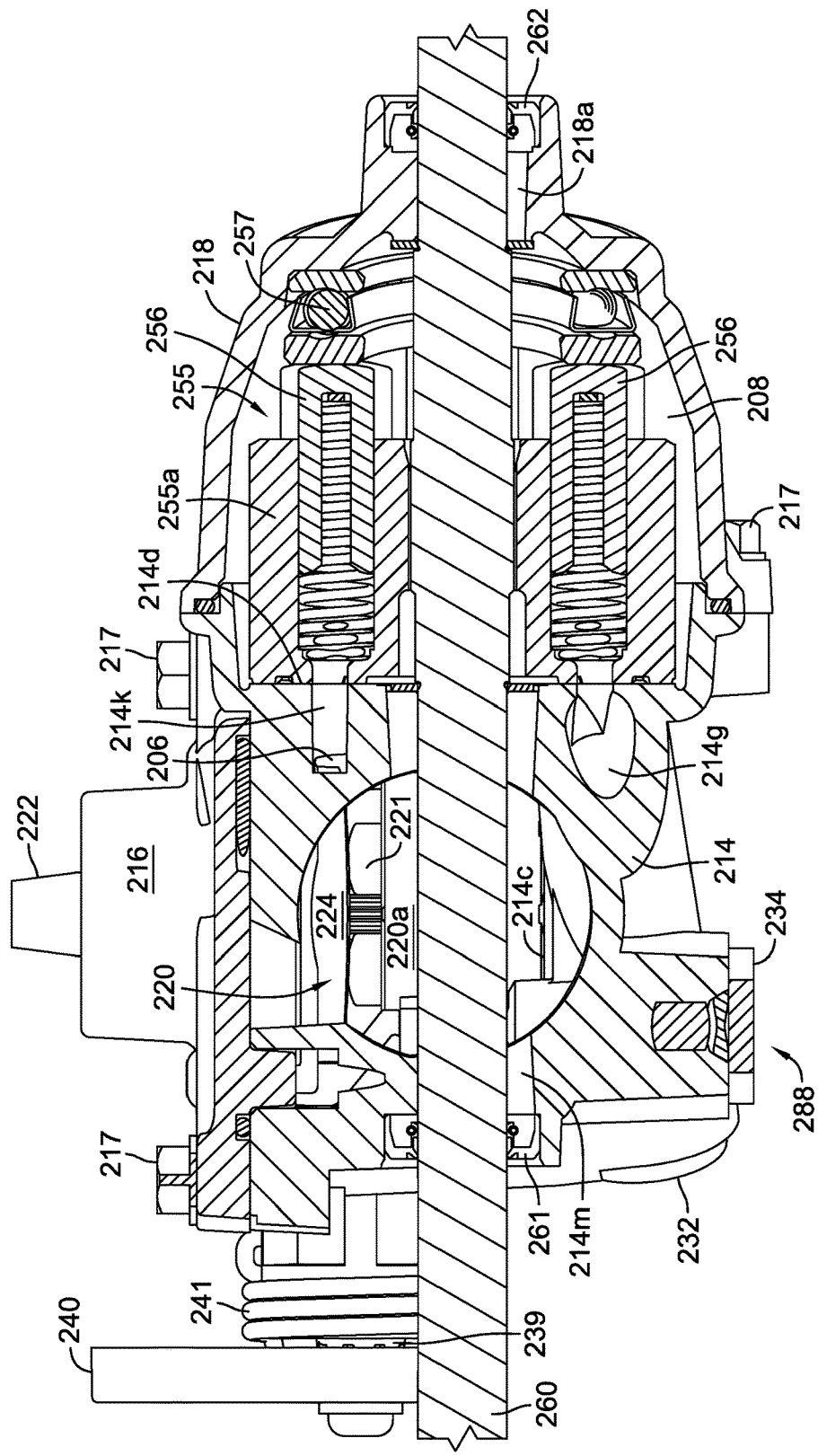
FIG. 18 is a cross-sectional view of a portion of the transmission of FIG. 16 along line 18-18 in FIG. 16.
Figure 19:
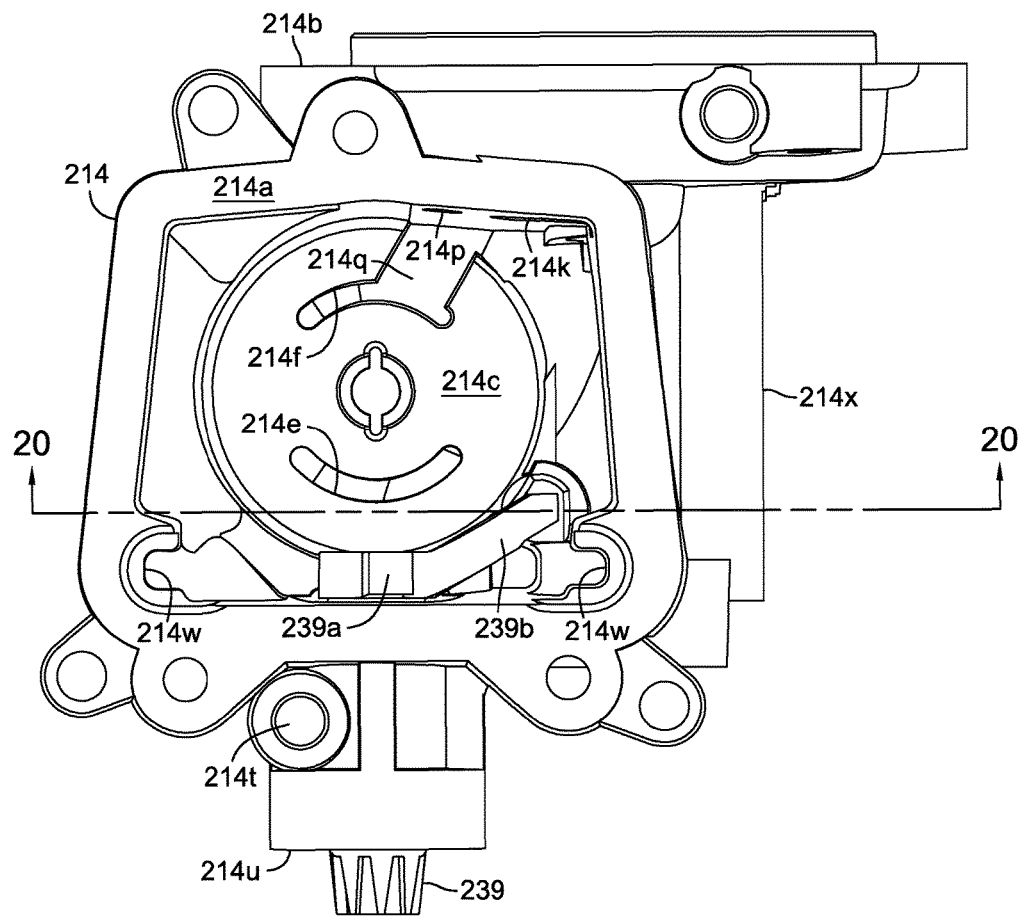
FIG. 19 is a plan view of a portion of the transmission of FIG. 14 with certain components removed for clarity.

Output shaft 260 is rotatably supported by motor cover 218 and main housing 214. A first output shaft seal 261 is provided in main housing 214 and a second output shaft seal 262 is provided in motor cover 218. As shown in FIG. 18, a pressure relief passage 214*m* is formed in main housing 214 leading from pump chamber 206 to output shaft seal 261 to prevent over-pressurization of output shaft seal 261 from any pumping effect attributable to rotation of output shaft 260. Also, a pressure relief passage 218*a* is formed in motor cover 218 leading from motor chamber 208 to output shaft seal 262 to prevent shaft-rotation-induced pressurization of output shaft seal 262.

Main housing 214 also provides a pump running surface 214c having arcuate ports 214e and 214f for pump assembly 220 and a motor running surface 214d having arcuate ports 214r and 214s for motor assembly 255, with the pump running surface 214c oriented generally perpendicular to the motor running surface 214d. Main housing 214 thereby eliminates the need for a separate center section.

Referring primarily to FIGS. 15, 17, 18 and 19, the output of pump assembly 220 is adjustable via swash plate 224. A trunnion arm 239 for adjusting swash plate 224 passes through an opening 214u in a first side of main housing 214. Trunnion arm 239 is connected to a control arm 240 such that rotation of control arm 240 causes rotation of trunnion arm 239. Trunnion arm 239 has a first arm 239a that extends radially outward from the rotational axis of trunnion arm 239 and engages and aligns with a slot 224c formed in swash plate 224, such that rotation of trunnion arm 239 adjusts the position of swash plate 224. Swash plate 224 includes protrusions 224a and 224b that come into contact with stop features, such as stop 216e shown in FIG. 22, formed in pump cover 216 to limit the movement of swash plate 224 in a first and second direction, respectively. Trunnion arm 239 has a second arm 239b, which extends radially outward from the rotational axis of trunnion arm 239 so that its end is positioned proximate to a poppet 288b of bypass valve 288 when swash plate 224 is in the neutral position. The function of bypass valve 288 is described in greater detail below.

Figure 15:
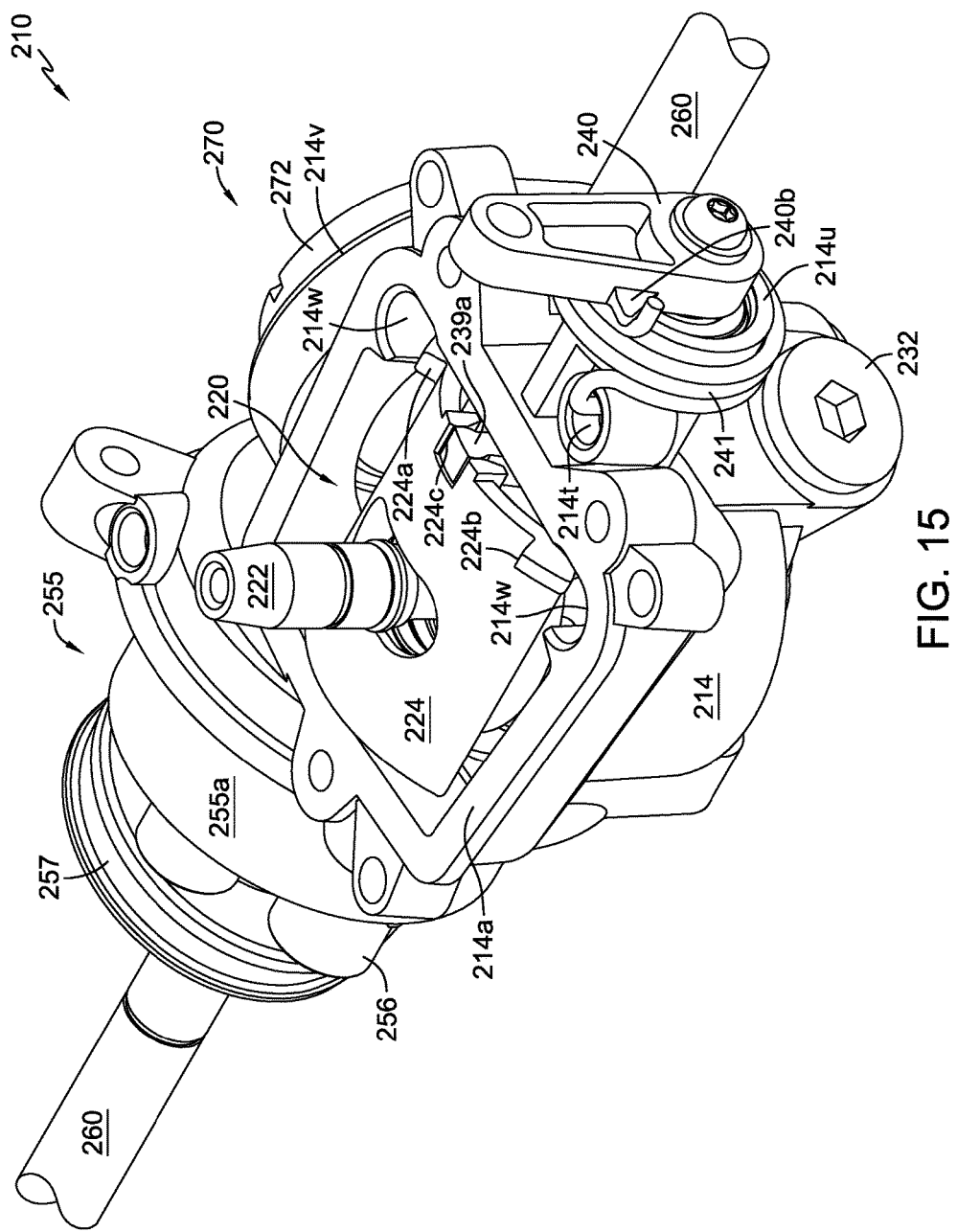
FIG. 15 is a perspective view of the transmission of FIG. 14 with certain components removed for clarity.
Figure 16:
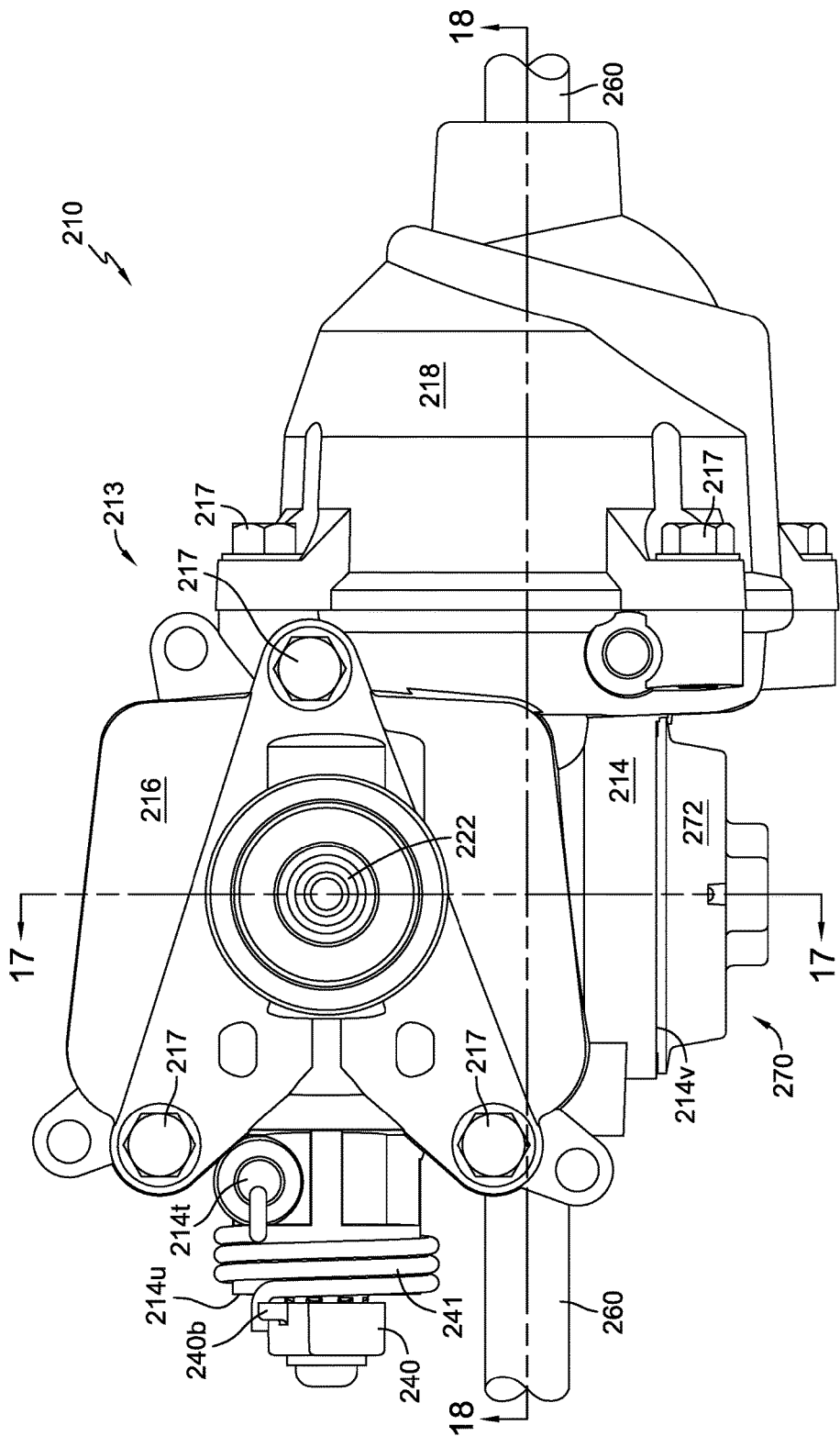
FIG. 16 is a plan view of the transmission of FIG. 14 with certain components removed for clarity.

Referring primarily to FIGS. 15 and 17, the volume and direction of hydraulic fluid flow from pump assembly 220 is controlled by rotating control arm 240. A plurality of pump pistons 221 in pump assembly 220 are in continuous contact with a pump thrust bearing 223 retained in swash plate 224. When an operator rotates control arm 240 in a clockwise or counterclockwise direction by means of controls and linkages (not shown), swash plate 224 is moved in an arc due to its engagement with first arm 239a. Movement of swash plate 224 changes the contact angle between the pump pistons 221 of pump assembly 220 and pump thrust bearing 223, thereby providing variable displacement hydraulic output to rotate motor assembly 255 and its motor output shaft 260 at various speeds. It should be understood that in the neutral position, subject to machining tolerances, second arm 239b does not crack bypass valve 288.

During a first or "forward" mode of operation, when trunnion arm 239 is rotated from a neutral position in a first direction (counterclockwise for the embodiment shown in FIG. 15), the output flow of pump assembly 220 is increased, thus increasing the output speed of motor 255 and its motor output shaft 260.

The porting and operations of this third embodiment vary from those of the previously described transmissions 10, 110. In the first mode of operation, hydraulic fluid flows between fluid port 214e formed in pump running surface 214c and fluid port 214s formed in motor running surface 214d by way of fluid passage 214g formed in housing 214 to provide fluid communication between pump assembly 220 and motor assembly 255 in an open hydraulic circuit. This is an open hydraulic circuit in that hydraulic fluid discharged from motor pistons 256 will flow through fluid passage 214k to pump chamber 206 instead of being ported directly back to the pump assembly 220. Drain passage 214p further allows excess hydraulic fluid in motor chamber 208 to drain into pump chamber 206. Pump assembly 220 draws hydraulic fluid directly from pump chamber 206 via pump inlet passage 214q and arcuate port 214f. This open hydraulic circuit prevents reverse operation of transmission 210.

Figure 20:
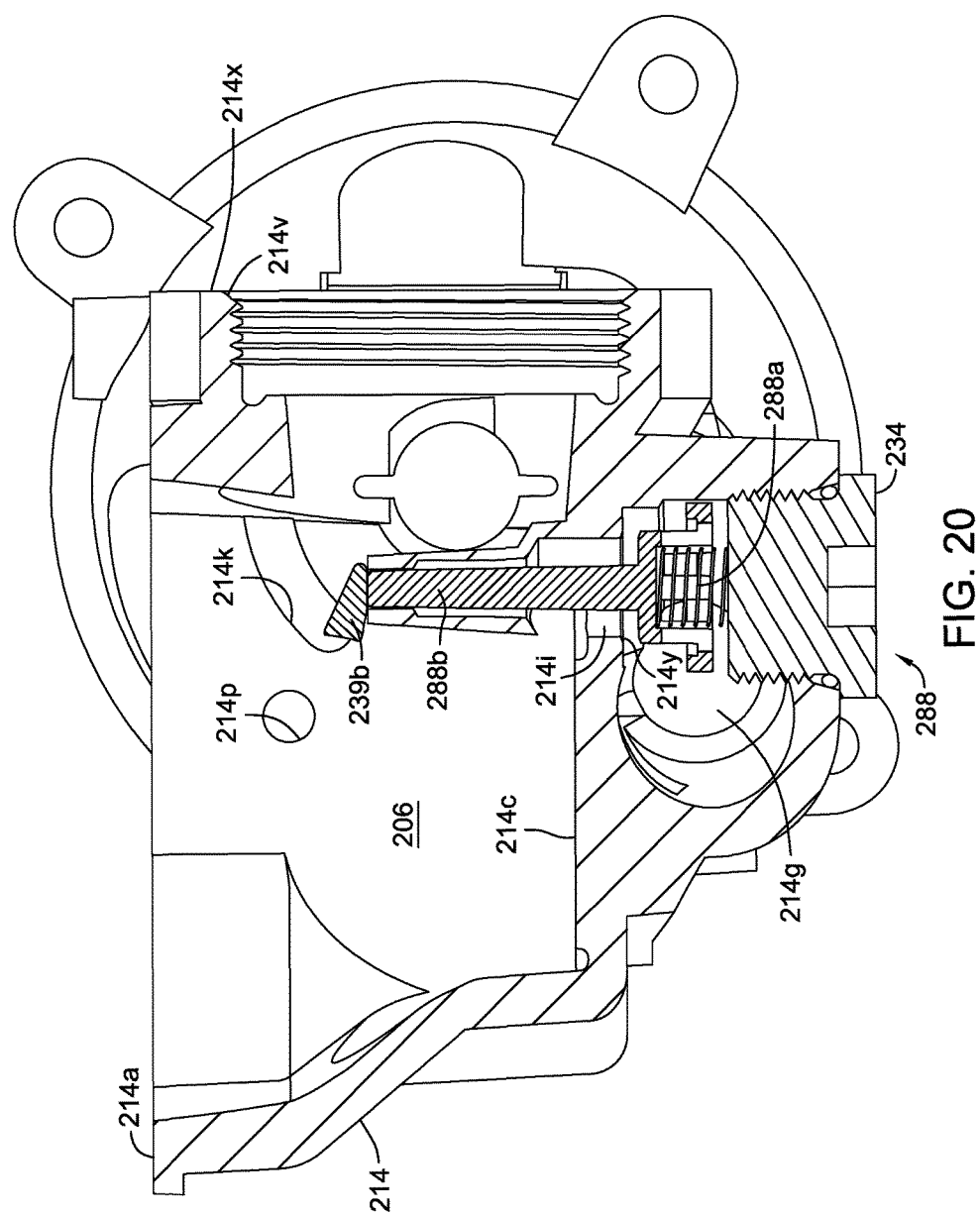
FIG. 20 is a cross-sectional view of a portion of the transmission of FIG. 19 along line 20-20 in FIG. 19.

During a second or "bypass" mode of operation, trunnion arm 239 is rotated from the neutral position in a second, opposite direction (clockwise in FIG. 15) causing the second arm 239b to open bypass valve 288 so that fluid communication between motor assembly 255 and pump assembly 220 is broken. Bypass valve 288 may be a poppet style valve having a spring 288a, one end of which bears upon a poppet 288b to close bypass valve 288 against valve seat 214y and prevent communication between fluid passages 214g and 214i unless second arm 239b of trunnion arm 239 bears upon poppet 288b to crack valve 288, as shown in FIG. 20. The other end of spring 288a bears against bypass valve plug 234 which seals main housing 214. Fluid passage 214i is open to pump chamber 206; thus, the discharge from pump assembly 220 via arcuate port 214e and fluid passage 214g is circulated directly back into pump chamber 206 via fluid passage 214i without providing fluid to motor assembly 255. Consequently, an operator of a walk-behind mower so equipped may manually pull the mower backward without difficulty.

A return-to-bypass spring 241 is disposed about trunnion arm 239 and an opening 214u on a first side of main housing 214 to bias trunnion arm 239 to a bypass position. One end of return-to-bypass spring 241 bears against projection 240b of control arm 240 and the other end extends into and bears upon pocket 214t of main housing 214, thus biasing trunnion arm 239 to the second or bypass mode of operation.

As in the first and second embodiments, a fluid expansion bladder assembly 270 is provided to relieve case pressure from transmission 210 and prevent pressurization of hydraulic fluid adjacent various seals of transmission 210 as the fluid temperature rises and the fluid expands during operation of transmission 210. As shown in FIGS. 17 and 20, bladder assembly 270 is located on a second side 214x of main housing 214 rather than on the pump cover. Bladder assembly 270 is installed in an expansion bladder port 214v formed on the second side 214x of main housing 214. Port 214v can be internally threaded, as shown, to receive an expansion bladder cap 272. Expansion bladder assembly 270 comprises a chamber 276 defined on one end by the expansion bladder cap 272 and on the opposite end by a membrane 274, wherein membrane 274 seals off pump chamber 206 and is able to expand to accommodate hydraulic fluid expansion.

Figure 21:
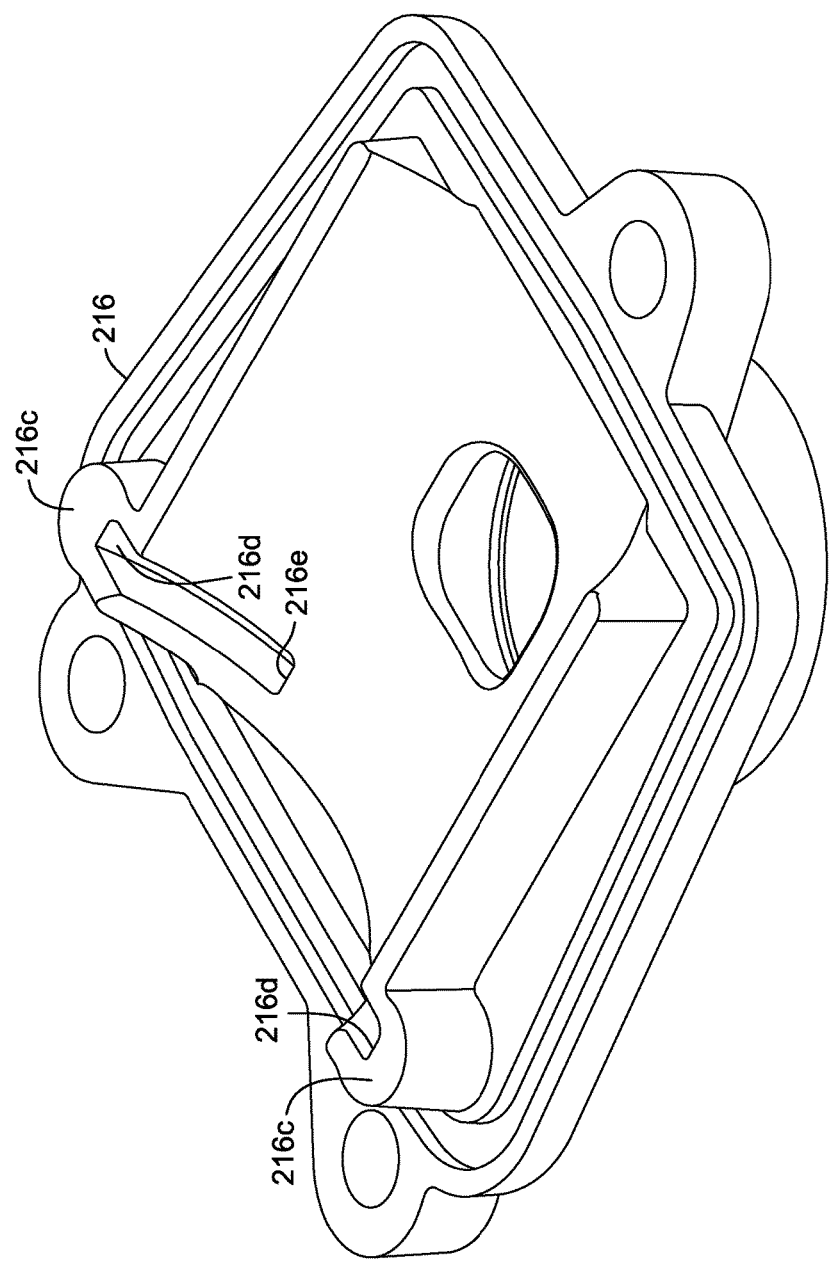
FIG. 21 is a perspective view of the pump cover of the transmission of FIG. 14.
Figure 22:
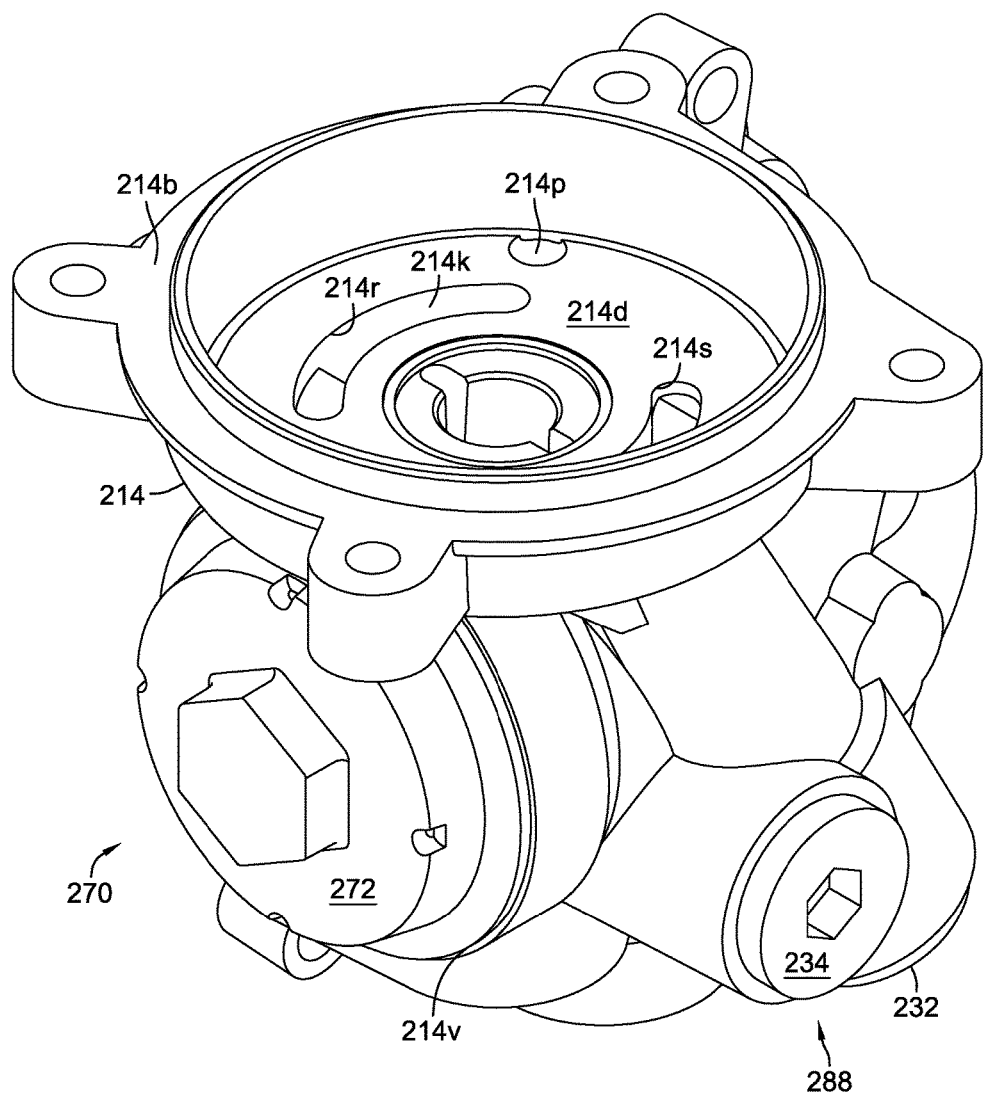
FIG. 22 is a perspective view of the main housing and certain other components of the transmission of FIG. 14.

As shown in FIG. 21, the interior of pump cover 216 has alignment projections 216c which mate with alignment pockets 214w (shown in FIGS. 15 and 19) to ensure proper alignment of pump cover 216 with main housing 214. Swash plate guide grooves 216d, which guide the movement of swash plate 224, are formed integrally with the alignment projections 216c to ensure accurate location of swash plate 224 when pump cover 216 is attached to main housing 214.

While one or more specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

I claim:

1. A hydraulic drive mechanism, comprising:
   a housing comprising a first housing element joined to a second housing element to form a pump chamber, wherein the first housing element comprises:
   a first surface having a pump running surface formed thereon;

a second surface having a motor running surface formed thereon; and hydraulic porting formed in the first housing element, whereby the pump running surface is hydraulically connected to the motor running surface through the hydraulic porting;

a pump disposed on the pump running surface and a motor comprising a motor body disposed on the motor running surface, wherein both the pump and the motor are hydraulically connected to the hydraulic porting;

a single output shaft engaged to and directly driven by the motor body, the single output shaft comprising a first end extending through a first shaft seal and out a first side of the housing, and a second end; and a first pressure relief passage formed in the housing and connecting the pump chamber to a portion of the housing adjacent to the first shaft seal.

2. The hydraulic drive mechanism of claim 1, wherein the second end of the single output shaft extends through a second shaft seal and out a second side of the housing, opposite to the first side, and the hydraulic drive mechanism further comprises a second pressure relief passage formed in the housing and connecting the pump chamber to a second portion of the housing adjacent to the second shaft seal.

3. The hydraulic drive mechanism of claim 2, wherein the first pressure relief passage and the second pressure relief passage are formed in the first housing element.

4. The hydraulic drive mechanism of claim 3, wherein the housing further comprises a motor cover engaged to the first housing element.

5. The hydraulic drive mechanism of claim 4, further comprising a third pressure relief passage formed in the motor cover and between the second pressure relief passage and the second portion of the housing adjacent to the second shaft seal.

6. The hydraulic drive mechanism of claim 5, further comprising a valve disposed in a valve bore, and wherein the first housing element further comprises a third surface separate from the first surface and the second surface, wherein the valve bore is formed in the third surface and has a first bore end open to the pump chamber and a second bore end open to the hydraulic porting.

7. The hydraulic drive mechanism of claim 6, further comprising a swash plate engaged to the pump, and a trunnion comprising a first arm engaged to the swash plate to rotate the swash plate to vary the output of the pump, and a second arm which rotates with the first arm, the second arm having an operative end that is capable of engaging the valve, whereby the operative end of the second arm opens the valve to permit a hydraulic connection between the porting and the pump chamber through the valve bore when the trunnion is rotated to a predetermined position, wherein the first arm and the second arm are disposed entirely within the pump chamber.

8. The hydraulic drive mechanism of claim 7, further comprising an external control arm disposed outside the housing and engaged to the trunnion, wherein the trunnion further comprises a rotatable shaft having a distal end disposed in the pump chamber and engaged to both the first arm and the second arm, and a proximal end disposed outside the housing and engaged to the external control arm.

9. A hydraulic drive mechanism, comprising:
a housing comprising a cover joined to a main housing to form a pump chamber;
a pump running surface formed on the main housing and a motor running surface formed on the main housing, where the pump running surface is hydraulically connected to the motor running surface through hydraulic porting formed in the main housing;
a valve bore formed in a surface of the housing separate from the pump running surface and the motor running surface, the valve bore having a first bore end open to the pump chamber and a second bore end open to the hydraulic porting,
a valve disposed in the valve bore;
a pump disposed on the pump running surface and a motor comprising a motor cylinder block disposed on the motor running surface, wherein both the pump and the motor are hydraulically connected to the porting;
a single output shaft engaged to and driven by the motor cylinder block, the single output shaft comprising a first end extending through a first shaft seal and out a first side of the housing and a second end; and
a swash plate engaged to the pump, and a trunnion comprising a first arm engaged to the swash plate to rotate the swash plate to vary the output of the pump, and a second arm which rotates with the first arm, the second arm having an operative end that is capable of engaging the valve, whereby the operative end of the second arm opens the valve to permit a hydraulic connection between the porting and the pump chamber through the valve bore when the trunnion is rotated to a predetermined position, wherein the second arm is disposed entirely within the pump chamber.

10. The hydraulic drive mechanism of claim 9, further comprising a first pressure relief passage formed in the housing and connecting the pump chamber to a portion of the housing adjacent to the first shaft seal.

11. The hydraulic drive mechanism of claim 9, wherein the second end of the single output shaft extends through a second shaft seal and out a second side of the housing, opposite to the first side.

12. The hydraulic drive mechanism of claim 11, further comprising a first pressure relief passage formed in the housing and connecting the pump chamber to a portion of the housing adjacent to the first shaft seal and a second pressure relief passage formed in the housing and connecting the pump chamber to a second portion of the housing adjacent to the second shaft seal.

13. The hydraulic drive mechanism of claim 12, wherein the first pressure relief passage and the second pressure relief passage are formed in the main housing.

14. The hydraulic drive mechanism of claim 13 wherein the housing further comprises a motor cover engaged to the main housing.

15. The hydraulic drive mechanism of claim 14, wherein the housing further comprises a third pressure relief passage formed in the motor cover and between the second pressure relief passage and the second shaft seal.

16. The hydraulic drive mechanism of claim 9, wherein the first arm is also disposed entirely within the pump chamber.

17. A hydraulic drive mechanism, comprising:
a housing comprising a first housing component joined to a second housing component to form a sump, the first housing component having a pump running surface, a motor running surface and internal porting formed inside the first housing component to join the pump running surface and the motor running surface;
a valve disposed in a valve bore formed in the first housing component, the valve bore having a first end open to the sump on an internal surface of the first housing component and a second end open to the internal porting;

a pump rotatably disposed on the pump running surface and a motor disposed on the motor running surface, wherein both the pump and the motor are hydraulically connected to the internal porting;

an output shaft driven by the motor and a pump input shaft engaged to and driving the pump; and a swash plate disposed in the sump and engaged to the pump, and a trunnion comprising a first arm engaged to the swash plate to rotate the swash plate to vary the output of the pump, and a second arm which rotates with the first arm, the second arm having an operative end that is capable of engaging the valve, whereby the operative end of the second arm opens the valve to permit a hydraulic connection between the internal porting and the sump through the valve bore when the trunnion is rotated to a predetermined position, and the second arm is disposed entirely within the sump.

18. The hydraulic drive mechanism of claim 17, wherein the first arm is also disposed entirely within the sump.

19. The hydraulic drive mechanism of claim 18, wherein the trunnion further comprises a rotatable portion engaged to both the first arm and the second arm, wherein the rotatable portion extends out the housing and is engaged to an external control arm.

* * * * *